（12）United States Patent
Guan

(10) Patent No.: US 12,127,128 B2
(45) Date of Patent: Oct. 22, 2024

(54) ANTENNA PANEL MANAGEMENT AND BEAM MANAGEMENT METHOD AND DEVICE

(71) Applicant: HUAWEI TECHNOLOGIES CO., LTD., Guangdong (CN)

(72) Inventor: Peng Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 517 days.

(21) Appl. No.: 17/323,072

(22) Filed: May 18, 2021

(65) Prior Publication Data

US 2021/0274438 A1    Sep. 2, 2021

Related U.S. Application Data

(63) Continuation of application No. PCT/CN2019/121315, filed on Nov. 27, 2019.

(30) Foreign Application Priority Data

Dec. 7, 2018    (CN) .......................... 201811498010.7

(51) Int. Cl.
H04W 52/02    (2009.01)
(52) U.S. Cl.
CPC ..... *H04W 52/028* (2013.01); *H04W 52/0225* (2013.01)
(58) Field of Classification Search
None
See application file for complete search history.

(56) References Cited

U.S. PATENT DOCUMENTS

| 9,736,794 | B1* | 8/2017 | Liu .......................... H04W 4/06 |
| 10,236,726 | B2* | 3/2019 | Khan ...................... H02J 50/20 |
| 2001/0035134 | A1* | 11/2001 | Stapelfeld ............ A01K 15/023 |
| | | | 119/720 |

(Continued)

FOREIGN PATENT DOCUMENTS

| CN | 101638084 A | * 2/2010 |
| CN | 102090131 A | 6/2011 |

(Continued)

OTHER PUBLICATIONS

Ericsson, "Beam management in C-DRX", 3GPP TSG-RAN WG1 #91, Reno, USA, Nov. 27-Dec. 1, 2017, R1-1720720.*

(Continued)

*Primary Examiner* — Andrew C Oh
(74) *Attorney, Agent, or Firm* — Fish & Richardson P.C.

(57) ABSTRACT

Example antenna panel management methods of a terminal device are described. One example method includes that the terminal device enters a sleep mode from an active mode. When the terminal device is ready to re-enter the active mode from the sleep mode, if sleep duration is less than a preset threshold, a single panel of the terminal device is activated. If the sleep duration is greater than or equal to the preset threshold, a plurality of panels of the terminal device are activated. The terminal device activates a panel based on sleep duration between two consecutive DRX ON modes, so that a suitable panel can be activated in time, and a suitable beam can be further found for communication with a base station.

12 Claims, 8 Drawing Sheets

(56) References Cited

U.S. PATENT DOCUMENTS

| | | | |
|---|---|---|---|
| 2002/0092835 A1* | 7/2002 | Uehara | B23K 26/22 |
| | | | 219/121.64 |
| 2004/0170219 A1* | 9/2004 | Sasaki | H04B 7/0811 |
| | | | 375/148 |
| 2007/0263647 A1* | 11/2007 | Shorty | H04L 12/10 |
| | | | 370/406 |
| 2009/0252109 A1* | 10/2009 | Kim | H04B 7/0689 |
| | | | 370/330 |
| 2010/0195549 A1* | 8/2010 | Aragon | H04W 52/0232 |
| | | | 370/311 |
| 2010/0309779 A1* | 12/2010 | Amini | H04H 20/72 |
| | | | 370/312 |
| 2011/0021186 A1 | 1/2011 | Fischer | |
| 2012/0238288 A1* | 9/2012 | Donaldson | G01S 3/20 |
| | | | 455/456.1 |
| 2013/0077574 A1* | 3/2013 | Ekpenyong | H04L 5/0094 |
| | | | 370/329 |
| 2013/0222515 A1* | 8/2013 | Abuan | H04L 45/306 |
| | | | 348/14.01 |
| 2013/0336188 A1 | 12/2013 | Yomo et al. | |
| 2014/0198696 A1* | 7/2014 | Li | H04W 52/0229 |
| | | | 370/311 |
| 2015/0030091 A1* | 1/2015 | El-Najjar | H04B 7/0691 |
| | | | 375/267 |
| 2015/0056933 A1* | 2/2015 | Yan | H04B 1/44 |
| | | | 455/78 |
| 2015/0078189 A1* | 3/2015 | Kwon | H04W 24/08 |
| | | | 370/252 |
| 2016/0028375 A1* | 1/2016 | Feldman | H03J 7/02 |
| | | | 455/193.1 |
| 2016/0094796 A1* | 3/2016 | Govil | H04N 25/771 |
| | | | 348/295 |
| 2016/0127972 A1* | 5/2016 | Ananthanarayanan | |
| | | | H04W 76/30 |
| | | | 370/332 |
| 2016/0164580 A1* | 6/2016 | El-Najjar | H04B 7/0691 |
| | | | 375/267 |
| 2017/0026794 A1* | 1/2017 | Baker | H04W 40/244 |
| 2017/0201289 A1* | 7/2017 | Zhang | H04B 7/0608 |
| 2017/0251518 A1* | 8/2017 | Agiwal | H04W 76/28 |
| 2017/0303265 A1* | 10/2017 | Islam | H04W 72/23 |
| 2018/0020403 A1* | 1/2018 | Komati | H04B 7/0871 |
| 2018/0131434 A1* | 5/2018 | Islam | H04B 7/0408 |
| 2018/0167883 A1* | 6/2018 | Guo | H04B 7/0617 |
| 2018/0255607 A1* | 9/2018 | Nagaraja | H04L 5/0053 |
| 2018/0262313 A1* | 9/2018 | Nam | H04L 5/0044 |
| 2018/0375561 A1* | 12/2018 | Park | H04B 7/0456 |
| 2019/0037495 A1* | 1/2019 | John Wilson | H04W 56/001 |
| 2019/0053162 A1* | 2/2019 | Islam | H04W 52/0229 |
| 2019/0097874 A1* | 3/2019 | Zhou | H04L 5/0023 |
| 2019/0123803 A1* | 4/2019 | Raghavan | H04B 17/318 |
| 2019/0159280 A1* | 5/2019 | Chakraborty | H04W 76/15 |
| 2019/0184230 A1* | 6/2019 | Lee | G01S 19/52 |
| 2020/0275319 A1* | 8/2020 | Murray | H04W 36/304 |

FOREIGN PATENT DOCUMENTS

| | | | | |
|---|---|---|---|---|
| CN | 101638084 B | * | 8/2011 | |
| CN | 102918780 A | | 2/2013 | |
| CN | 104486820 A | * | 4/2015 | ........ H04W 52/0206 |
| CN | 107528625 A | | 12/2017 | |
| CN | 107734615 A | | 2/2018 | |
| CN | 107735975 A | | 2/2018 | |
| CN | 108092678 A | | 5/2018 | |
| CN | 108776331 A | * | 11/2018 | ............. G01S 11/02 |
| CN | 108885558 A | * | 11/2018 | ............. G06F 1/329 |
| CN | 109429551 A | * | 3/2019 | ........... H04B 7/0617 |
| CN | 111164924 A | * | 5/2020 | ........... H04L 1/1812 |
| CN | 111294891 A | * | 6/2020 | ........... H04B 7/0408 |
| JP | 2003107169 A | * | 4/2003 | |
| JP | 2013529397 A | * | 7/2013 | |
| JP | 2014107705 A | * | 6/2014 | |
| WO | WO-2005076934 A2 | * | 8/2005 | ........... H04B 17/309 |
| WO | 2009034550 A3 | | 8/2009 | |
| WO | WO-2016055914 A1 | * | 4/2016 | ............ H03F 1/3241 |
| WO | WO-2016166182 A1 | * | 10/2016 | ............. H04W 24/02 |
| WO | WO-2016166664 A1 | * | 10/2016 | ............. H04W 72/08 |
| WO | WO-2017027055 A1 | * | 2/2017 | ............. H04B 7/024 |
| WO | WO-2017167767 A1 | * | 10/2017 | ................ H04L 1/00 |
| WO | WO-2018085144 A1 | * | 5/2018 | ............. H04W 24/08 |
| WO | 2018143875 A1 | | 8/2018 | |
| WO | WO-2018144873 A1 | * | 8/2018 | ........... H04B 7/0695 |
| WO | 2018203822 A1 | | 11/2018 | |
| WO | WO-2019032737 A1 | * | 2/2019 | ............. H04L 1/203 |
| WO | WO-2019143072 A1 | * | 7/2019 | ........... H04B 7/0404 |
| WO | WO-2020114294 A1 | * | 6/2020 | ........... H04B 7/0408 |

OTHER PUBLICATIONS

3GPP TS 38.211 V15.3.0 (Sep. 2018), "3rd Generation Partnership Project; Technical Specification Group Radio Access Network; NR; Physical channels and modulation (Release 15)," Sep. 2018, 96 pages.

3GPP TS 38.212 V15.3.0 (Sep. 2018), "3rd Generation Partnership Project; Technical Specification Group Radio Access Network; NR; Multiplexing and channel coding (Release 15)," Sep. 2018, 99 pages.

3GPP TS 38.213 V15.3.0 (Sep. 2018), "3rd Generation Partnership Project; Technical Specification Group Radio Access Network; NR; Physical layer procedures for control (Release 15)," Sep. 2018, 101 pages.

3GPP TS 38.214 V15.3.0 (Sep. 2018), "3rd Generation Partnership Project; Technical Specification Group Radio Access Network; NR; Physical layer procedures for data (Release 15)," Sep. 2018, 96 pages.

3GPP TS 38.321 V15.3.0 (Sep. 2018), "3rd Generation Partnership Project; Technical Specification Group Radio Access Network; NR; Medium Access Control (MAC) protocol specification (Release 15)," Sep. 2018, 76 pages.

3GPP TS 38.331 V15.3.0 (Sep. 2018), "3rd Generation Partnership Project; Technical Specification Group Radio Access Network; NR; Radio Resource Control (RRC) protocol specification (Release 15)," Sep. 2018, 445 pages.

Huang Dongyan, "Research on Energy Efficiency Optimization of MIMO Communication Technology," Beijing University of Posts and Telecommunications, Sep. 18, 2015, 120 pages.

Office Action issued in Chinese Application No. 201811498010.7 on Nov. 16, 2020, 7 pages.

PCT International Search Report and Written Opinion issued in International Application No. PCT/CN2019/121315 on Feb. 21, 2020, 13 pages (with English translation).

Weng et al., "Beam-Aware Dormant and Scheduling Mechanism for 5G Millimeter Wave Cellular Systems," IEEE Transactions on Vehicular Technology 67, No. 11, Sep. 17, 2018, 15 pages.

\* cited by examiner

ANTENNA PANEL MANAGEMENT AND BEAM MANAGEMENT METHOD AND DEVICE

CROSS-REFERENCE TO RELATED APPLICATIONS

This application is a continuation of International Application No. PCT/CN2019/121315, filed on Nov. 27, 2019, which claims priority to Chinese Patent Application No. 201811498010.7, filed on Dec. 7, 2018. The disclosures of the aforementioned applications are hereby incorporated by reference in their entireties.

TECHNICAL FIELD

This application relates to the communications field, and more specifically, to a device, a panel management method, and a beam management method of a terminal device.

BACKGROUND

In a conventional wireless communications network (for example, a 2G, 3G, or 4G network), an operating frequency band of a communications system is in a frequency range below 6 GHz. However, as fewer operating frequency bands are available in this frequency range, increasing communication demands cannot be satisfied. In a frequency range above 6 GHz, however, there are a large quantity of frequency bands not fully utilized. Therefore, a next-generation (for example, 5G) wireless communications network whose operating frequency band is above 6 GHz is under research and development in the industry, to provide an ultra-high-speed data communication service. Within the frequency range above 6 GHz, frequency bands that can be used in the next-generation wireless communications network include frequency bands at 28 GHz, 39 GHz, 60 GHz, 73 GHz, and the like. Because the operating frequency band is above 6 GHz, the next-generation wireless communications network has typical features of a high-frequency communications system, such as a large bandwidth and a highly integrated antenna array, so that a relatively high throughput can be achieved easily.

When a terminal uses a high frequency for communication, a plurality of antenna panels, panels for short, may be equipped, to cover a plurality of different directions. Each panel of the terminal sends one or more beams in one direction. When a plurality of panels are used, beams covering different directions are separately sent, so that omnidirectional sending and receiving of beams can be implemented.

Discontinuous reception (DRX) is an energy saving technology of a terminal, and includes connected mode discontinuous reception (CDRX), and the like. In brief, DRX is to configure a sleep mode and a wake-up mode for the terminal, and respective duration of the sleep mode and the wake-up mode. In the sleep mode, the terminal does not need to listen to data sent by a network device, thereby implementing energy saving.

In beam-based high-frequency communication, after entering the sleep mode, the terminal may lose beam alignment with a base station due to reasons such as movement, rotation, blocking, and a channel change. When the terminal wakes up, a beam that can be used to communicate with a base station needs to be found quickly.

However, because the terminal uses a plurality of panels, and each panel is configured to receive or send beams in different directions, how to activate a suitable panel to select a suitable beam to communicate with the base station is a problem that currently needs to be resolved.

SUMMARY

This application provides an antenna panel management method, so that a terminal device can activate a suitable panel, thereby reducing power consumption of the terminal device.

According to a first aspect, an antenna panel management method is disclosed. The method includes: A terminal device enters a sleep mode from an active mode. When the terminal device is ready to re-enter the active mode from the sleep mode, if sleep duration is less than a preset threshold, a single panel of the terminal device is activated; or if sleep duration is greater than or equal to a preset threshold, a plurality of panels of the terminal device are activated.

With reference to the foregoing solution, the method further includes: if the sleep duration is less than the preset threshold, the activated single panel is used for beam training; or if the sleep duration is greater than or equal to the preset threshold, the plurality of activated panels are used for beam training. After the beam training, a suitable beam can be found to communicate with a base station. Beam training may also be referred to as beam sweeping, beam alignment, or beam management.

With reference to the foregoing solution, the method further includes: The terminal device performs beam training based on configuration information corresponding to a beam management resource or a beam management resource set pre-delivered by a network device. If the sleep duration is less than the preset threshold, the network device delivers a beam management resource for the single panel; or if the sleep duration is greater than or equal to the preset threshold, the network device delivers beam management resources for the plurality of panels.

With reference to the foregoing solution, the single panel of the terminal device is a panel used last time, and the plurality of panels of the terminal device are all configured panels. The panel used last time is a most recently used panel, which may be a panel used for communication with the base station when the terminal device is in the active mode last time, or a panel configured or activated by the base station.

For example, the panel for communication with the base station may include one or more of the following: a most recently used panel for receiving a downlink channel or a downlink signal, a most recently configured or activated panel for receiving a downlink channel or a downlink signal, a most recently used panel for sending an uplink signal or an uplink channel; and a most recently configured or activated panel for sending an uplink signal or an uplink channel.

The downlink signal or channel may include one or more of the following: a physical downlink control channel (PDCCH), a physical downlink shared channel (PDSCH), and a channel state information reference signal (CSI-RS). The uplink signal or channel may include one or more of the following, a physical uplink control channel (PUCCH), a physical uplink shared channel (PUSCH), a sounding reference signal (SRS), and a random access channel (RACH).

With reference to the foregoing solution, "activated" means being enabled. In another example, the single panel may refer to a small part of panels, as long as the panel used last time is included, and the plurality of panels may refer to a large part of panels, including the panel used last time.

In the foregoing solution, the terminal device activates a panel based on sleep duration between two consecutive active modes, so that a suitable panel can be enabled in time, and a suitable beam can be further found for communication with the base station. If the sleep duration is short, it is considered that a location of the terminal device has not changed, and a panel used last time can be directly used, so that power consumption of the terminal device is reduced.

In another implementation, the most recently used panel may also be replaced with a preset panel. The preset panel may be one or more of the following: a panel with a smallest and/or largest panel identity (ID), a panel used to receive and/or send a low-frequency signal, a panel with a largest and/or smallest quantity of antenna elements, and a panel with a highest and/or lowest transmit power.

Corresponding to the foregoing method, a communications apparatus is further disclosed. The apparatus may be a terminal device, or may be a chip, a functional module, a functional unit, or the like in a terminal device. The apparatus includes:

a control module, configured to control mode switching of the communications apparatus, for example, control the communications apparatus to enter a sleep mode from an active mode or enter an active mode from a sleep mode; and an activation module, configured to activate or enable a panel of the communications apparatus, where for example, when the communications apparatus is ready to re-enter the active mode from the sleep mode, the activation module is configured to activate a single panel of the terminal device if sleep duration is less than a preset threshold; or the activation module is configured to activate a plurality of panels of the terminal device if sleep duration is greater than or equal to a preset threshold.

With reference to the foregoing solution, the apparatus may further include a communications module, configured to: if the sleep duration is less than the preset threshold, use the activated single panel for beam training; or if the sleep duration is greater than or equal to the preset threshold, use the plurality of activated panels for beam training.

The foregoing communications apparatus corresponds to the terminal device in the antenna panel management method, and is configured to implement a corresponding function in the method. For another related function feature, refer to the descriptions of the method. Details are not described herein again.

According to another aspect, a beam management method is disclosed, so that a terminal device can find a suitable beam in time to communicate with a network device.

The method includes: The terminal device enters a sleep mode from an active mode. When the terminal device re-enters the active mode from the sleep mode, if sleep duration is less than a preset threshold, a beam used last time is used for communication with the network device; or if sleep duration is greater than or equal to a preset threshold, a beam determined during random access is used for communication with the network device.

With reference to the foregoing solution, the method further includes: If the terminal device performs beam training in the sleep mode, when the terminal device re-enters the active mode, a beam for communication with the network device is determined based on a beam training result.

With reference to the foregoing solution, the method further includes: If the sleep duration is less than the preset threshold, the terminal device receives, by using the beam used last time, signaling that is used to indicate a beam management resource and that is delivered by the network device, and performs beam training based on the beam management resource by using a single panel; or if the sleep duration is greater than or equal to the preset threshold, the terminal device receives, by using the beam determined during random access, signaling that is used to indicate a beam management resource and that is delivered by the network device, and performs beam training based on the beam management resource by using a plurality of panels.

With reference to the foregoing solution, the single panel is a panel used last time, or a panel corresponding to the beam used last time, and the plurality of panels are all configured panels.

In another solution, all the configured panels may be directly used for beam training, and sleep duration does not need to be considered.

With reference to the foregoing solution, the beam determined during random access may include one or more of the following: a beam determined during initial access, a beam determined in a link reconfiguration process, or a beam determined in a re-timing process or an uplink synchronization process.

With reference to the foregoing solution, the beam used last time is a beam used for communication with a base station when the terminal device is in the active mode, or may be a beam configured or activated by a base station. For example, the panel used last time includes one or more of the following: a most recently used beam for receiving a downlink channel or a downlink signal, a most recently configured or activated beam for receiving a downlink channel or a downlink signal, a most recently used beam for sending an uplink signal or an uplink channel; and a most recently configured or activated panel for sending an uplink signal or an uplink channel.

The downlink signal or channel may include one or more of the following: a PDCCH, a PDSCH, and a CSI-RS. The uplink signal or channel may include one or more of the following: a PUCCH, a PUSCH, an SRS, and a RACH.

In another implementation, the most recently used beam may also be replaced with a preset beam. The preset beam may be one or more of the following: a beam with a smallest and/or largest beam ID, a beam used to receive and/or send a low-frequency signal, and a beam with a highest and/or lowest transmit power.

In the foregoing solution, the terminal device selects, based on sleep duration between two consecutive active modes, a suitable beam to communicate with the network device, so that the suitable beam is found in time. Further, a panel corresponding to the beam may be individually enabled, to reduce power consumption of the terminal device.

Corresponding to the foregoing beam management method, a communications apparatus is further disclosed. The apparatus may be the terminal device in the foregoing method, or may be a chip, a functional module, a functional unit, or the like in the terminal device. The communications apparatus includes:

a control module, configured to control mode switching of the communications apparatus, for example, control the communications apparatus to enter a sleep mode from an active mode or enter an active mode from a sleep mode; and a communications module, configured to select a suitable beam to communicate with a network device, where for example, when the communications apparatus re-enters the active mode from the sleep mode, if sleep duration is less than a preset threshold, the communications module is configured to communicate with the network device by using a beam used last time; or if sleep duration is greater than or equal to a preset threshold, the communications module is configured to communicate with the network device by using a beam determined during random access.

With reference to the foregoing solution, the communications apparatus further includes a determining module, configured to: if the communications apparatus performs beam training in the sleep mode, when the communications apparatus re-enters the active mode, determine, based on a beam training result, a beam for communication with the network device.

With reference to the foregoing solution, if the sleep duration is less than the preset threshold, the communications module is configured to: receive, by using the beam used last time, signaling that is used to indicate a beam management resource and that is delivered by the network device; and the communications module is configured to perform beam training based on the beam management resource by using a single panel. Alternatively, if the sleep duration is greater than or equal to the preset threshold, the communications module is configured to receive, by using the beam determined during random access, signaling that is used to indicate a beam management resource and that is delivered by the network device; and a beam training module is configured to perform beam training based on the beam management resource by using a plurality of panels.

The foregoing communications apparatus corresponds to the terminal device in the beam management method, and is configured to implement a corresponding function in the method. For another related function feature, refer to the descriptions of the method. Details are not described herein again.

With reference to the apparatus in the foregoing solution, the communications module may further include a sending module and/or a receiving module, to respectively implement a sending function and a receiving function in the method. The activation module and the determining module may alternatively be replaced with a processing module. In addition to implementing the functions of the foregoing two modules, the processing module may further implement another function in the method other than performing communication (sending and receiving) with the base station. For example, the processing module implements a function of a control module.

In the foregoing solutions, communication with the network device includes one or more of the following: listening to a physical downlink control channel (PDCCH), measuring and reporting a channel state information reference signal (CSI-RS), sending a sounding reference signal (SRS), sending a physical uplink control channel (PUCCH), transmitting a physical downlink shared channel (PDSCH) or a physical uplink shared channel (PUSCH), and receiving data sent by the network device.

The foregoing active mode is an active mode of DRX or connected mode discontinuous reception (CDRX), and is also referred to as an ON mode.

For the communications apparatus in the foregoing embodiments, there is an embodiment in another form. The function of the sending module is implemented by a transmitter, the function of the receiving module is implemented by a receiver, the transmitter and the receiver may form a transceiver, and the function of the communications module may be implemented by the transceiver. Functions of other modules such as the processing module, the control module, and the determining module are implemented by a processor.

The foregoing apparatuses are respectively corresponding to the terminal devices in the methods, or may be chips in the terminal devices, and the module may also be referred to as a unit. Therefore, additional features or limitations in the foregoing methods are also applicable to the foregoing apparatuses. Details are not described herein again, and reference may be made to the foregoing methods.

This application further provides a computer storage medium, and the computer storage medium stores a computer program (instruction). When the program (instruction) is run on a computer, the computer is enabled to perform the method in any one of the foregoing aspects.

This application further provides a computer program product. When the computer program product runs on a computer, the computer is enabled to perform the methods in the foregoing aspects.

This application further provides a communications chip storing instructions, and when the instructions are run on a terminal, the terminal is enabled to perform the methods in the foregoing aspects.

This application further provides a communications apparatus, including a memory, a processor, and a computer program that is stored in the memory and that can be run on the processor. When executing the computer program, the processor implements the methods in the foregoing aspects.

DESCRIPTION OF EMBODIMENTS

Figure 1:
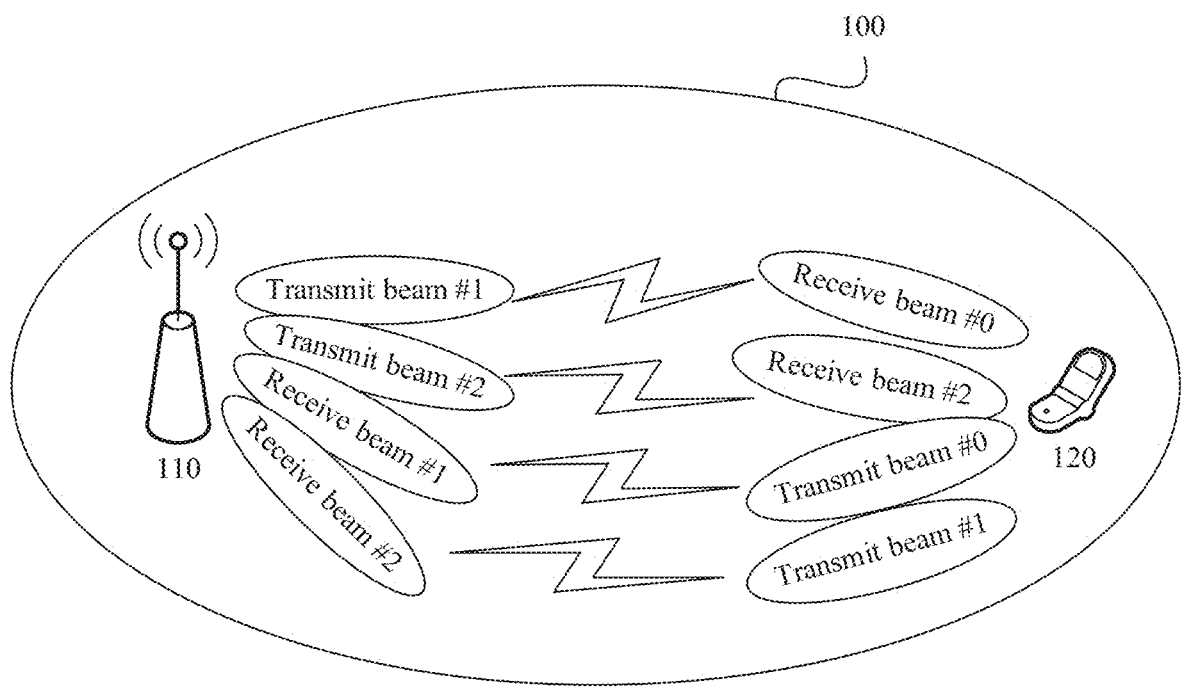
FIG. 1 is an example schematic diagram of a communications network according to an embodiment of this application.

The following describes technical solutions in embodiments of the present invention with reference to the accompanying drawings in the embodiments of the present invention.

The technical solutions of the embodiments of this application may be used in various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, a new radio (NR) system, or another future communications system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN) or another future communications system, or the like. This is not limited in the embodiments of this application.

A network device in the embodiments of this application may be a device used to communicate with the terminal device. The network device may be a base transceiver station (BTS) in a global system for mobile communications (GSM) or a code division multiple access (CDMA) system; may be a NodeB (NB) in a wideband code division multiple access (WCDMA) system; may be an evolved NodeB (eNB or eNodeB) in an LTE system; or may be a radio controller in a cloud radio access network (CRAN) scenario. Alternatively, the network device may be a relay station, an access point, a vehicle-mounted device, a wearable device, a network device in a 5G network, a network device in a future evolved PLMN network, another future communications system, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more of computer operating systems implementing service processing through a process, for example, a Linux operating system, a Unix operating system, an Android operating system, an iOS operating system, or a Windows operating system. The application layer includes applications such as a browser, an address book, word processing software, and instant communications sofhvare. In addition, a specific structure of an execution body of a method is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or may be performed by a functional module that is in the terminal device or the network device and that can invoke and execute a program.

In addition, methods in aspects of this application may be implemented through programming, and a computer program that can be accessed by a computer-readable component, carrier, or medium is formed. For example, the computer-readable medium may include but is not limited to a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The "machine-readable media" may include but is not limited to a radio channel, and various other media that can store, contain, and/or carry instructions and/or data.

For ease of understanding the embodiments of this application, a communications system applicable to the embodiments of this application is described in detail with reference to FIG. 1.

FIG. 1 is a schematic diagram of a communications system 100 applicable to an embodiment of this application. As shown in FIG. 1, the communications system 100 includes at least one network device 110 and at least one terminal device 120. In the communications system 100, the terminal device and the network device may obtain one or more beam pairs that enable better communication in a beam management process. The beam pairs are <Bx, B'x> and <By, B'y>, where Bx represents a transmit beam of the network device, B'x represents a receive beam of the terminal device. By represents a transmit beam of the terminal device, and B'y represents a receive beam of the network device. For example, referring to FIG. 1, a transmit beam #1 of the network device and a receive beam #0 of the terminal device are a beam pair, and a transmit beam #2 of the network device and a receive beam #2 of the terminal device are a beam pair. A transmit beam #0 of the terminal device and a receive beam #1 of the network device are a beam pair, and a transmit beam #1 of the terminal device and a receive beam #2 of the network device are a beam pair.

In the communications system 100, beams of the terminal device 120 and the network device 110 need to be aligned to normally perform communication. Because the terminal device and the network device each can face toward a plurality of beam directions, a prerequisite for communication is that there is a correct beam. Specifically, in downlink communication, the network device needs to notify the terminal device of a receive beam to be used to receive a signal sent by the network device subsequently, or notify the terminal device of a transmit beam used by the network device to send a signal subsequently. In uplink communication, the network device needs to notify the terminal device of a transmit beam to be used to send an uplink signal, or notify the terminal device of a receive beam used by the network device to receive a signal sent by the terminal device. For example, in downlink transmission, the network device may notify the terminal device that the network device performs transmission by using the transmit beam #1, so that the terminal device needs to perform receiving by using the receive beam #0. Alternatively, the network device performs transmission by using the transmit beam #1, and notifies the terminal device that the terminal device uses the receive beam #0 to perform receiving. For another example, in uplink transmission, the network device may notify the terminal device that the terminal device uses the transmit beam #0 to perform transmission, so that the network device performs receiving by using the receive beam #1. Alternatively, the network device may notify the terminal device that a receive beam used by the network device is the receive beam #1, so that the terminal device needs to perform transmission by using the transmit beam #0.

For ease of understanding the embodiments of this application, the following briefly describes several terms used in this application.

A beam is a communications resource. The beam may be a wide beam, a narrow beam, or a beam of another type. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent on different beams. Optionally, a plurality of beams having same or similar communications features may be considered as one beam. One beam may include one or more antenna ports, configured to transmit a data channel, a control channel, a sounding signal, and the like.

The beam may alternatively be understood as a spatial resource, and may be a transmit or receive precoding vector with energy transmission directivity. The energy transmission directivity may mean that a signal, received in a spatial position, on which precoding processing has been performed by using the precoding vector has a relatively good receive power, for example, meets a received demodulation signal-to-noise ratio. The energy transmission directivity may also mean that same signals sent from different spatial positions and received by using the precoding vector have different receive powers. A same device (for example, a network device or a terminal device) may have different precoding vectors, and different devices may also have different precoding vectors, in other words, the different devices correspond to different beams. For a configuration or a capability of a device, one device may use one or more of a plurality of different precoding vectors at a same moment, in other words, one or more beams may be simultaneously formed. From perspectives of transmitting and receiving, beams can be classified into transmit beams and receive beams.

The transmit beam is a directional beam transmitted through a plurality of antennas by using the beamforming technology.

The receive beam is also directional in a direction of receiving a signal, and directed to a transmitting direction of the transmit beam as much as possible, to further improve a received signal-to-noise ratio and avoid interference between users.

The beam may also be referred to as a spatial filter, or referred to as a spatial parameter. The transmit beam may also be referred to as a spatial transmit filter, and the receive beam may also be referred to as a spatial receive filter.

A beam pairing relationship is a pairing relationship between a transmit beam and a receive beam, that is, a pairing relationship between a spatial transmit filter and a spatial receive filter. A relatively large beamforming gain can be obtained by transmitting a signal between a transmit beam and a receive beam that have a beam pairing relationship.

In an implementation, a transmit end and a receive end may obtain a beam pairing relationship through beam training. Specifically, the transmit end may send a reference signal in a beam sweeping manner, and the receive end may also receive a reference signal in a beam sweeping manner. Specifically, the transmit end may form different directional beams in space through beamforming, and may perform polling on a plurality of different directional beams, to transmit a reference signal by using the different directional beams, so that a maximum power for transmitting the reference signal by the transmit end in a direction directed by a transmit beam can be reached. The receive end may also form different directional beams in space through beamforming, and may perform polling on a plurality of different directional beams, to receive a reference signal by using the different directional beams, so that a maximum power for receiving the reference signal by the receive end in a direction directed by a receive beam can be reached.

A reference signal and a reference signal resource are respectively a signal that may be used for channel measurement, channel estimation, or the like, and a resource that may be used to configure a transmission attribute of a reference signal, for example, a time-frequency resource location, a port mapping relationship, a power factor, and a scrambling code. A transmit end device may send a reference signal based on a reference signal resource, and a receive end device may receive a reference signal based on a reference signal resource.

Channel measurement in this application also includes beam measurement. To be specific, beam quality information is obtained by measuring a reference signal, and a parameter used to measure a beam quality includes a reference signal received power (RSRP). However, this is not limited thereto. For example, the beam quality may alternatively be measured by using parameters such as a reference signal received quality (RSRQ), a signal-to-noise ratio (SNR), a signal-to-interference-plus-noise ratio (SINR), a block error rate (BLER), and a channel quality indicator (CQI). In the embodiments of this application, for ease of description, unless otherwise specified, the channel measurement may be considered as the beam measurement.

The reference signal may include, for example, a channel state information reference signal (CSI-RS), a synchronization signal block (SSB), or a sounding reference signal (SRS). Correspondingly, the reference signal resource may include a CSI-RS resource, an SSB resource, or an SRS resource.

It should be noted that the foregoing SSB may also be referred to as a synchronization signal/physical broadcast channel block (SS/PBCH block), and the corresponding SSB resource may also be referred to as a synchronization signal/physical broadcast channel block resource (SS/PBCH block resource) that may be referred to as an SSB resource for short.

To distinguish between different reference signal resources, each reference signal resource may correspond to a reference signal resource identifier, for example, a CSI-RS resource identifier (CRI), an SSB resource identifier (SSBRI), or an SRS resource index (SRI). The SSB resource identifier may also be referred to as an SSB index.

It should be understood that the reference signals and the corresponding reference signal resources enumerated above are merely examples for description, and shall not constitute any limitation on this application. This application does not exclude a possibility of defining another reference signal in a future protocol to implement a same or similar function.

Beam indication information is information used to indicate a beam, including a transmit beam and/or a receive beam, used for transmission. The beam indication information may be one or more of the following: a beam number (in other words, a sequence number, an index, an identity (ID), and the like), an uplink signal resource number, a downlink signal resource number, an absolute beam index, a relative beam index, a logical beam index, an index of an antenna port corresponding to a beam, an index of an antenna port group corresponding to a beam, an index of a downlink signal corresponding to a beam, a time index of a downlink synchronization signal block corresponding to a beam, beam pair link (BPL) information, a transmit parameter (Tx parameter) corresponding to a beam, a receive parameter (Rx parameter) corresponding to a beam, a transmit weight corresponding to a beam, a weight matrix corresponding to a beam, a weight vector corresponding to a beam, a receive weight corresponding to a beam, an index of a transmit weight corresponding to a beam, an index of a weight matrix corresponding to a beam, an index of a weight vector corresponding to a beam, an index of a receive weight corresponding to a beam, a receive codebook corresponding to a beam, a transmit codebook corresponding to a beam, an index of a receive codebook corresponding to a beam, or an index of a transmit codebook corresponding to a beam. The downlink signal may be one or more of the following: a synchronization signal, a broadcast channel, a broadcast signal, a demodulation signal, a synchronization signal block (SSB)/broadcast channel block, a channel state information reference signal (CSI-RS), a cell-specific reference signal (CRS), a UE-specific reference signal (US-RS), a downlink control channel demodulation reference signal (DMRS), a downlink data channel demodulation reference signal, or a downlink phase noise tracking signal. The uplink signal may be one or more of the following: an uplink random access sequence, an uplink sounding reference signal (SRS), an uplink control channel demodulation reference signal, an uplink data channel demodulation reference signal, or an uplink phase noise tracking signal.

The beam indication information may alternatively be represented as a transmission configuration indicator (TCI) or a TC state. One TC state includes one or more pieces of quasi-colocation (QCL) information, and each piece of QCL information includes an ID of one reference signal (or one synchronization signal block) and one QCL type. For example, the terminal device may need to determine, based on a TC state (which is usually carried on a physical downlink control channel (PDCCH)) indicated by the network device, a beam for receiving a physical downlink shared channel (PDSCH).

A beam management resource is a resource used for beam management, or may be embodied as a resource used for calculating and measuring a beam quality. The beam quality includes a layer 1 reference signal received power (L1-RSRP), a layer 1 reference signal received quality (L1-RSRQ), a layer 1 signal-to-interference-plus-noise ratio (L1-SINR), and the like. Specifically, the beam management resource may include a synchronization signal, a broadcast channel, a downlink channel measurement reference signal, a tracking signal, a downlink control channel demodulation reference signal, a downlink shared channel demodulation reference signal, an uplink sounding reference signal, an uplink random access signal, and the like.

Quasi-colocation (QCL) is also referred to as quasi-co-location. A quasi-colocation relationship is used to indicate that a plurality of resources have one or more same or similar communications features. For a plurality of resources that have a quasi-colocation relationship, a same or similar communications configuration may be used. Details are as follows: Signals corresponding to antenna ports that have a QCL relationship have a same parameter; a parameter (which may also be referred to as a QCL parameter) of an antenna port may be used to determine a parameter of another antenna port that has a QCL relationship with the antenna port; two antenna ports have a same parameter; or a parameter difference between two antenna ports is less than a threshold. The parameter may include one or more of the following: a delay spread, a Doppler spread, a Doppler shift, an average delay, an average gain, and a spatial reception parameter (spatial Rx parameters). The spatial reception parameter may include one or more of the following: an angle of arrival (AOA), an average AOA, an AOA spread, an angle of departure (AOD), an average angle of departure (AOD), an AOD spread, a receive antenna spatial correlation parameter, a transmit antenna spatial correlation parameter, a transmit beam, a receive beam, and a resource identifier.

Spatial quasi-colocation (spatial QCL) may be considered as a type of QCL. For "spatial", it may be understood from a perspective of a transmit end or a receive end. From the perspective of the transmit end, if two antenna ports are spatially quasi-colocated, it means that beam directions corresponding to the two antenna ports are spatially consistent. From the perspective of the receive end, if the two antenna ports are spatially quasi-colocated, it means that the receive end can receive, in a same beam direction, signals sent by the two antenna ports.

Quasi-colocation assumption (QCL assumption) refers to an assumption that there is a QCL relationship between two ports. A configuration and an indication of the quasi-colocation assumption may be used to help the receive end receive and demodulate a signal. For example, the receive end can assume that there is a QCL relationship between a port A and a port B. To be specific, a large-scale parameter of a signal measured on the port A may be used for signal measurement and demodulation on the port B. The large-scale parameter may include the parameter of the antenna ports.

Simultaneous reception mentioned in the present invention includes a case in which a receive end (for example, UE) receives a plurality of signals by using one receive parameter, and further includes a case in which the receive end receives a plurality of signals by using a plurality of receive parameters that can be simultaneously used.

Antenna panel: A signal in wireless communications needs to be received and sent through an antenna, and a plurality of antenna elements may be integrated on one panel. One radio frequency chain may drive one or more antenna elements. In the embodiments of this application, the terminal device may include a plurality of antenna panels, and each antenna panel includes one or more beams. The network device may also include a plurality of antenna panels, and each antenna panel includes one or more beams. The antenna panel may alternatively be represented as an antenna array or an antenna subarray. One antenna panel may include one or more antenna arrays/subarrays. One antenna panel may be controlled by one or more oscillators. The radio frequency chain may also be referred to as a receive channel and/or a transmit channel, a receiver branch, or the like. One antenna panel may be driven by one radio frequency chain, or may be driven by a plurality of radio frequency chains. Therefore, the antenna panel in this application may alternatively be replaced with a radio frequency chain, a plurality of radio frequency chains that drive one antenna panel, or one or more radio frequency chains that are controlled by one oscillator.

Analog beamforming may be implemented through radio frequency. For example, a radio frequency chain (RF chain) adjusts a phase by using a phase shifter, to control a change in a direction of an analog beam. Therefore, one RF chain can generate only one analog beam at a same moment.

DRX is an energy-saving technology for a terminal. In brief, DRX is used to configure a sleep mode or an active mode for the terminal, and respective duration of the sleep mode and active mode. The terminal listens to, in the active mode, data sent in the network, and does not need to listen to, in the sleep mode, data sent by the network, thereby achieving an objective of energy saving.

DRX includes long DRX and short DRX. The following describes some terms in DRX with reference to FIG. 2.

A DRX long cycle is duration of a DRX cycle, that is, a time length of a long DRX cycle.

A DRX ON duration timer is duration timer of a DRX cycle, that is, a time length of a terminal staying in an ON mode of one DRX cycle. The ON mode is also referred to as an active mode, and may be represented as DRX ON. The DRX ON mode indicates that power consumption of the terminal is high, because the terminal needs to monitor a control channel, perform reference signal measurement, and the like.

A DRX inactivity timer is duration after a PDCCH occasion in which a PDCCH indicates new UL or DL transmission for a MAC entity, that is, a time length of UE remaining in the ON mode after receiving one PDCCH. The PDCCH is a PDCCH that indicates uplink (UL) or downlink (DL) transmission. This is because after the PDCCH is received, data is sent or received subsequently. Therefore, even if an originally set DRX ON duration timer expires, the terminal should remain in the DRX ON mode to complete data sending or receiving.

A DRX short cycle is a short DRX cycle, that is, a time length of a short DRX cycle.

A DRX short cycle timer is duration in which UE shall follow a short DRX cycle, that is, a time length of a terminal using a short DRX cycle mode, for example, a time length of one short DRX cycle (DRX short cycle), or time lengths of a plurality of short DRX cycles. If there is no configuration for short DRX, a configuration for long DRX can be used alone.

Figure 2:
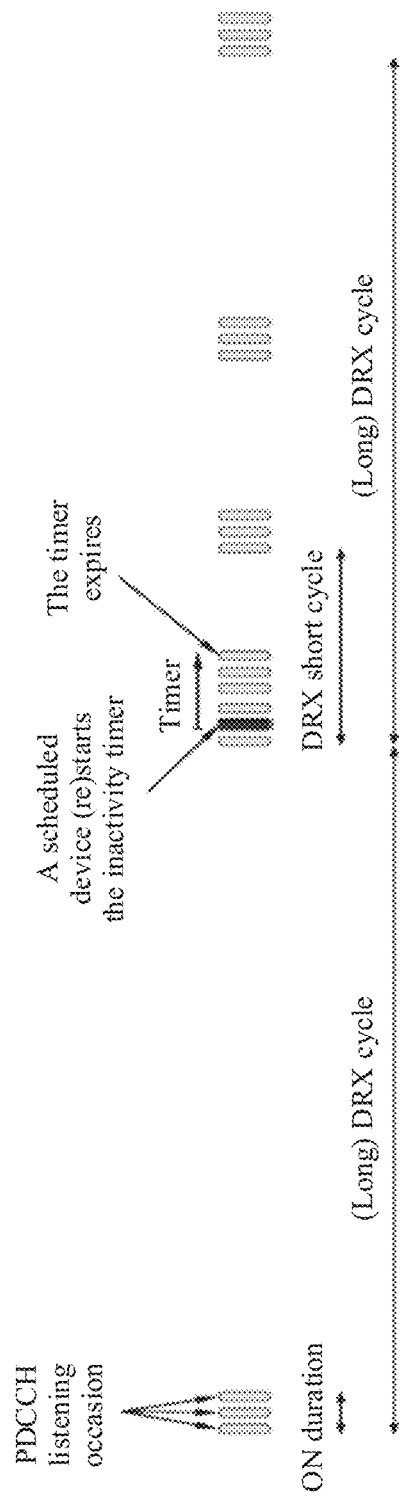
FIG. 2 is an example flowchart of DRX according to an embodiment of this application.

For example, in FIG. 2, the terminal is in ON duration, that is, an active mode in long DRX, and a PDCCH needs to be listened to. If there is no transmitted data, the terminal enters a sleep mode after the DRX ON duration timer expires. In next long DRX, the terminal enters the ON mode, and if a PDCCH is received in a slot such as a second slot, the DRX inactivity timer is started. If there is transmitted data, even if originally set ON duration ends, the terminal should remain in the ON mode to complete data sending or receiving. Then, the terminal re-enters the sleep mode and enters a next DRX cycle.

In beam-based high-frequency communication, after entering the sleep mode, the terminal may lose beam alignment with an original base station due to reasons such as movement, rotation, blocking, and a channel change. When re-entering the DRX ON mode, the terminal needs to quickly find a beam that can be used to communicate with a base station.

In addition, the terminal includes a plurality of panels, and a specific time is required for switching a panel from the sleep mode to a working mode. Therefore, the terminal needs to determine a quantity of panels to be activated and panels to be activated when the terminal enters the ON mode. Activating all configured panels can provide highest reliability, but also causes highest power consumption. Activating one panel may cause a reliability problem. For example, there is no suitable beam for the panel to communicate with a base station. Consequently, it is difficult to accurately determine a specific panel to be activated. If an unsuitable panel is activated, the terminal may not be able to perform beam communication with the base station.

An embodiment of this application provides an antenna panel management method of a terminal device. The terminal device may determine, based on sleep duration in DRX, a panel to be activated. If the sleep duration is long, a plurality of or all configured panels are activated, to perform beam training. If the sleep duration is short, only a single panel or some panels needs/need to be activated, to perform beam training.

In the foregoing manner, it is ensured, as much as possible, that the terminal device can activate a suitable quantity of panels, and power consumption of the terminal device is reduced. The following describes this embodiment of this application in detail with reference to the accompanying drawings.

Figure 3:
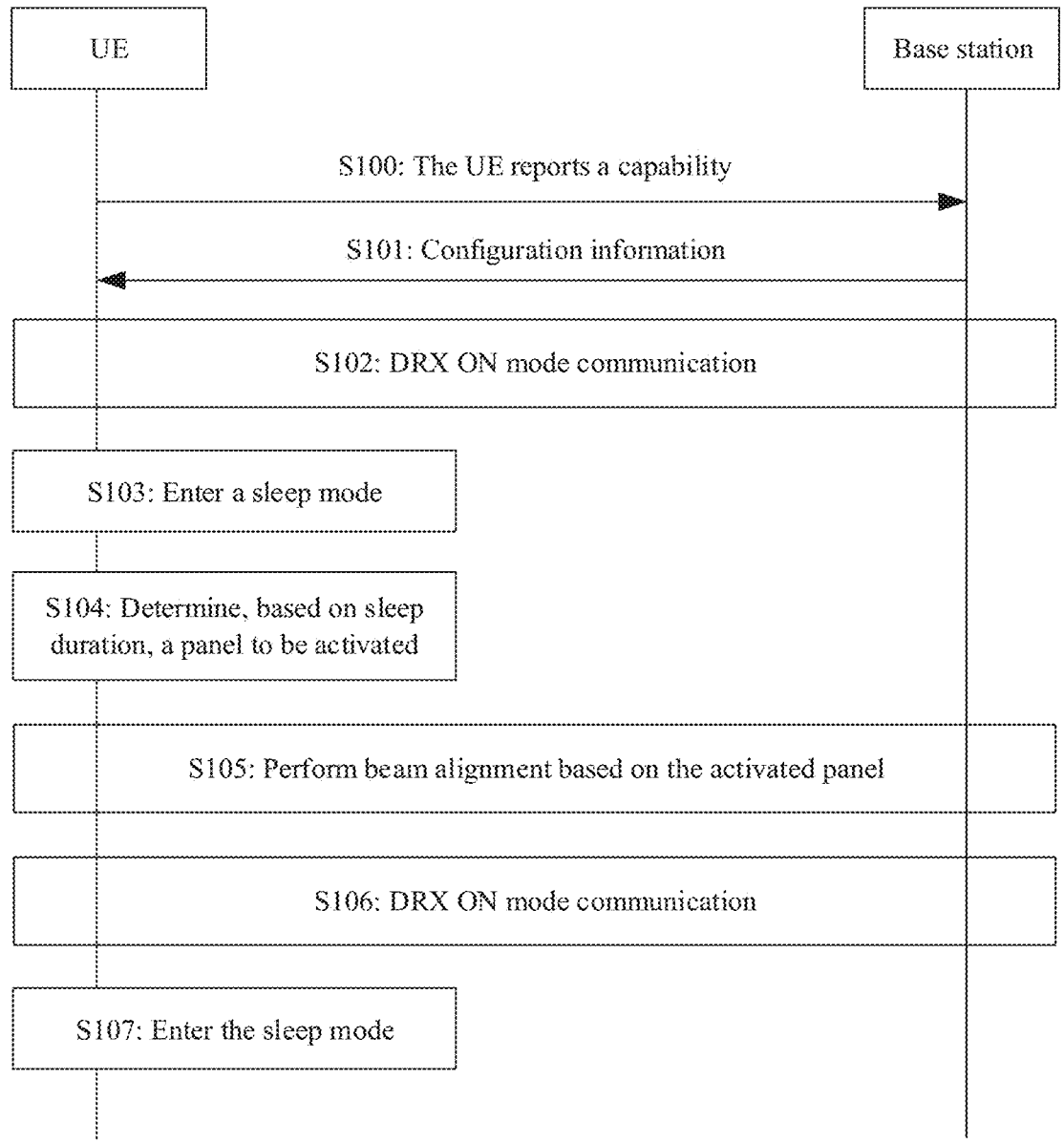
FIG. 3 is a flowchart of an antenna panel management method according to an embodiment of this application.

FIG. 3 is a flowchart of an antenna panel management method shown from a perspective of device interaction. It should be understood that, in this embodiment of this application, an example in which a terminal device and a network device are execution bodies is used to describe a beam information indication method. By way of using example but not limitation, the execution bodies may alternatively be a chip used in a terminal device and a chip used in a network device. The following uses an example in which the terminal device is UE and the network device is a base station for description.

S100: The UE reports a capability (UE capability report).

The UE reports the capability to the base station. The UE may proactively report the capability of the UE; or the base station may initiate a UE capability report request, and the UE reports a related capability of the UE to the base station after receiving the request.

When the UE capability changes, an updated UE capability can be reported to the base station. For example, the UE may send, to the base station, a request used to indicate that the capability of the UE has changed. After receiving the request, the base station configures an uplink resource for the UE, and then the UE reports the updated UE capability to the base station by using the uplink resource.

For example, the UE capability may include one or more of the following:
- a quantity of receive panels of the UE, for example, {1-8}, where {1-8} indicates that the UE may report one integer in 1 to 8, for example, 4, which indicates that the UE has four receive panels, where the foregoing numeric range is merely an example, the foregoing quantity is not limited thereto, and this also applies to the following case;
- a quantity of transmit panels of the UE, for example, {1-8}, where
- a panel may simultaneously be a transmit panel and a receive panel, or may be used only for sending or receiving;
- a quantity of receive panels that can be simultaneously used by the UE, for example, {1-8};
- a quantity of transmit panels that can be simultaneously used by the UE, for example, {1-8};
- a quantity of beams that can be received by each receive panel of the UE, for example, {1-16};
- a quantity of beams that can be sent by each transmit panel of the UE, for example, {1-16};
- a capability of the UE to switch a receive panel, which may include one or more of the following:
- duration from a time when the panel is off to a time when the panel is enabled, for example, {0, 2, 3} ms;
- a time for receive panel switching, for example, {0, 0.5, 1} ms; and a quantity of receive panel switching times within a period of time, where for example, the UE can perform panel switching for a maximum of {1, 2, 4, 7, 14} times within one slot;

a capability of the UE to switch a transmit panel, which may include one or more of the following:

duration from a time when the panel is off to a time when the panel is enabled, for example, {0, 2, 3} ms;

a time for transmit panel switching, for example, {0, 0.5, 1} ms; and a quantity of transmit panel switching times within a period of time, where for example, the UE can perform panel switching for a maximum of {1, 2, 4, 7, 14} times within one slot.

After receiving the capability reported by the UE, the base station may consider the capability when performing network configuration, and does not perform configuration beyond the capability of the UE.

S101: The base station sends configuration information to the UE.

The configuration information in this embodiment includes a DRX configuration. For details, refer to the foregoing descriptions of DRX. Details are not described herein again.

The configuration information may further include a configuration of a beam management resource. The configuration information may include:

a configuration of an uplink beam management resource, for example, a configuration of an SRS resource and/or an SRS resource set, where the configuration of the uplink beam management resource may further include a configuration of an SRS resource setting; and a configuration of a downlink beam management resource, for example, a configuration of a CSI-RS resource and/or a CSI-RS resource set, where the configuration of the downlink beam management resource may further include a configuration of a CSI-RS resource setting.

S102: The UE performs normal communication with the base station when the UE is in a DRX ON mode.

The normal communication includes, for example, listening to a PDCCH, measuring and reporting a CSI-RS, sending an SRS, sending an uplink PUCCH, and transmitting a PDSCH or a PUSCH.

S103: The UE enters a sleep mode.

The UE enters the sleep mode based on the DRX configuration. For example, the UE no longer listens to the PDCCH.

S104: The UE is ready to enter the DRX ON mode, and the UE determines, based on sleep duration, a panel to be activated.

For example, if the sleep duration is less than or equal to (or less than) a preset duration threshold, the UE enables only a single panel such as a most recently used panel or a preset panel. If the sleep duration is greater than (or greater than or equal to) a preset duration threshold, the UE enables a plurality of panels or all configured panels.

The most recently used panel may include one or more of the following:

a most recently used panel for receiving a PDCCH/PDSCH/CSI-RS;

a most recently configured or activated panel for receiving a PDCCH/PDSCH/CSI-RS;

a most recently used panel for sending a PUCCH/PUSCH/SRS/RACH; and a most recently configured or activated panel for sending a PUCCH/PUSCH/SRS/RACH.

The preset panel includes one or more of the following:

a panel with a smallest/largest panel ID;

a panel used to receive/transmit a low-frequency signal;

a panel with a largest/smallest quantity of antenna elements; and a panel with a highest/lowest transmit power.

The sleep duration is a time length between two consecutive DRX ON modes of the UE. The duration threshold may be a preset value. If the sleep duration is very short, it may be considered that a location of the terminal basically has not changed, and the panel used last time or the preset panel may continue to be used. If the sleep duration is relatively long, it is considered that a location of the terminal has changed, and the panel used last time is not suitable. Therefore, a plurality of or all configured panels need to be enabled to find a suitable beam. The panel used last time may be a panel used for communication with the base station when the UE is in the DRX ON mode last time.

In another example, the following manner may also be used:

If the sleep duration is less than or equal to (or less than) the preset duration threshold, the UE enables some panels, including the most recently used panel or the preset panel. If the sleep duration is greater than (or greater than or equal to) the preset duration threshold, the UE enables all the configured panels.

In the foregoing example, the foregoing some panels may be a small part of panels, and all the configured panels may be a large part of panels.

The sleep duration is related to one or more of the following parameters:

DRX cycle duration, for example, a DRX long cycle and a DRX short cycle;

duration of an active mode in each DRX cycle, for example, a DRX ON duration timer;

extended duration of the active mode after a PDCCH is received, for example, a DRX inactivity timer; and extended duration of the active mode for retransmission, for example, a DRX retransmission timer DL or a DRX retransmission timer UL.

The sleep duration may be determined by the DRX cycle duration. For example, if the UE works in a short DRX cycle mode, it is considered that the sleep duration is short, and a single panel should be used. If the UE works in a long DRX cycle mode, it is considered that the sleep duration is long, and a plurality of panels should be used. Alternatively, if a DRX cycle is less than or equal to (or less than) a preset DRX cycle duration threshold, it is considered that the sleep duration is short, and a single panel should be used. If a DRX cycle is greater than or equal to (or greater than) a preset DRX cycle duration threshold, it is considered that the sleep duration is long, and a plurality of panels should be used.

Figure 4:
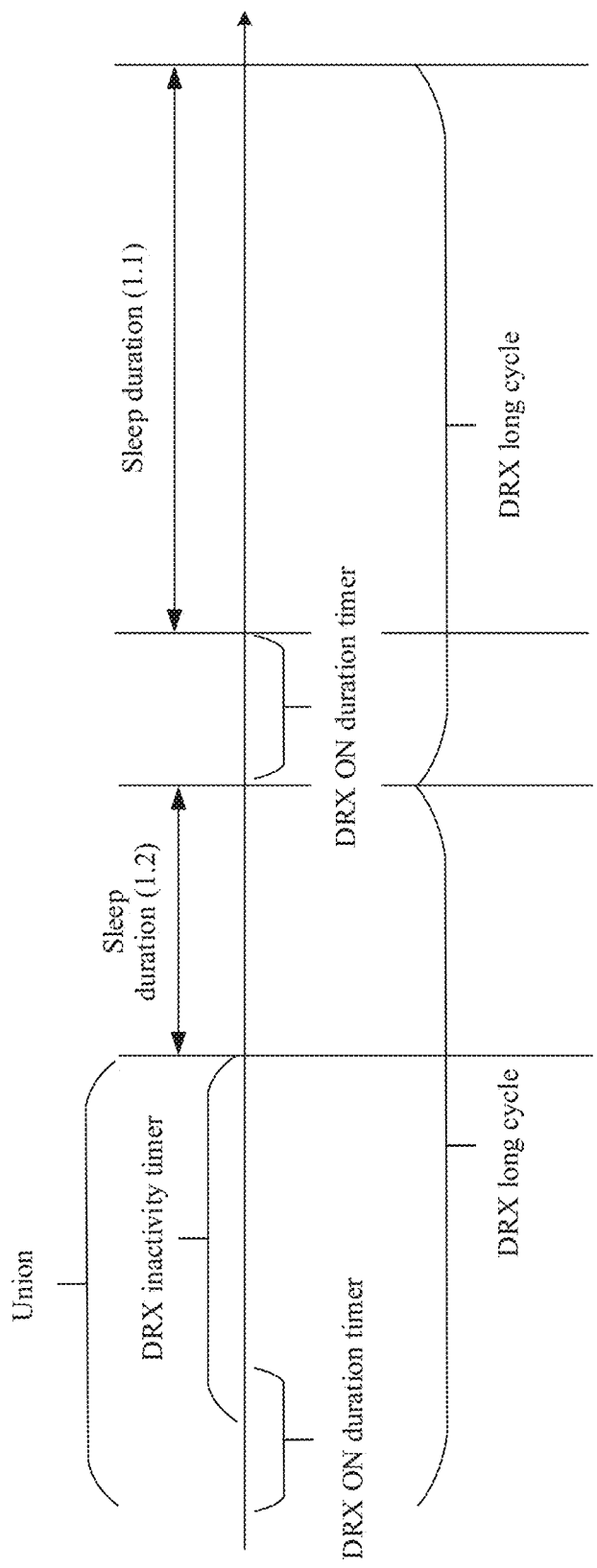
FIG. 4 is a schematic diagram of DRX sleep duration according to an embodiment of this application.

Further, the sleep duration may be jointly determined based on the DRX cycle duration, the DRX ON duration timer, and the DRX inactivity timer. For example, refer to FIG. 4.

1. If only a DRX long cycle is configured:

1.1 If no PDCCH is received in the DRX ON mode, sleep duration=the DRX long cycle-a DRX ON duration timer.

1.2 If a PDCCH is received in the DRX ON mode, a DRX inactivity timer is started, and sleep duration=the DRX long cycle-(a DRX ON duration timer)U(the DRX inactivity timer).

2. If a DRX short cycle is further configured, in the short DRX cycle mode;
2.1 If no PDCCH is received in the ON mode, sleep duration=the DRX short cycle-a DRX ON duration timer.
2.2 If a PDCCH is received in the ON mode, sleep duration=the DRX short cycle-(a DRX ON duration timer)∪(a DRX inactivity timer).

S105: Perform beam re-alignment between the base station and the UE based on the activated panel.

Beam management may be triggered by the base station. The base station delivers, to the UE, signaling or indication information used to indicate the beam management resource, and may use one or more pieces of control signaling or control information such as RRC, a MAC-CE, or DCI to configure or activate the beam management resource. The beam management resource may be configured or activated based on consideration of the capability reported by the UE in S200, and a configuration does not exceed the UE capability.

For example, in uplink beam management, the base station configures or activates one or more SRS resources/SRS resource sets. Correspondingly, the UE should perform beam training by using the SRS resource or the SRS resource set configured or activated by the base station.

Based on S104, if the sleep duration is less than or equal to (or less than) the preset duration threshold, the UE uses a "single panel mode" to perform beam training, and the UE uses the single panel to send an SRS. Certainly, some or a few panels may alternatively be used.

If the sleep duration is greater than (or greater than or equal to) the preset duration threshold, the UE uses a "multi-panel mode" to perform beam training, and the UE uses the plurality of panels or all the configured panels to send an SRS. Beam training may also be referred to as beam sweeping or beam management.

In addition, the "single panel mode" or the "multi-panel mode" may also be used for downlink beam management, for example, receiving a CSI-RS delivered by a measurement base station.

Based on S104, if the sleep duration is less than or equal to (or less than) the preset duration threshold, the UE uses the "single panel mode" to perform beam management, and the measurement base station uses the single panel to send the CSI-RS. Certainly, some or a few panels may alternatively be used.

If the sleep duration is greater than (or greater than or equal to) the preset duration threshold, the measurement base station uses the "multi-panel mode" to perform beam training, and the UE uses the plurality of panels or all the configured panels to send the CSI-RS.

The single panel mode is applicable to a scenario in which the UE searches for an optimal transmit beam and/or an optimal receive beam in a relatively small range when a transmit panel and/or a receive panel are/is determined.

The multi-panel mode is applicable to a scenario in which an optimal panel needs to be selected from a plurality of panels, where the UE needs to scan in a relatively large range for a suitable beam that can be used for communication with the base station.

After the foregoing beam training process, the UE may determine a beam to communicate with the base station. After the beam training, only a panel corresponding to the beam may be used, and other panels are disabled or some of other panels are disabled. Alternatively, the panel may not be disabled.

Therefore, the UE does not expect to be configured with beam management resources for a plurality of panels when the sleep duration is less than (or less than or equal to) the preset threshold. This is because only a single panel is activated in this case. The UE does not expect to be configured with a beam management resource for a single panel when the sleep duration is greater than (or greater than or equal to) the preset threshold. This is because a plurality of or all configured panels are enabled in this case.

UL SRS sending is used as an example. If the base station can clearly configure a transmit panel of each SRS, "a beam management resource for a single panel" means that panel indications of all SRS resources are the same. In addition, "beam management resources for a plurality of panels" means that panel indications of all SRS resources may be different.

In conclusion, the UE uses the single panel mode when the sleep duration is less than (or less than or equal to) the preset threshold; and the UE uses the multi-panel mode when the sleep duration is greater than (or greater than or equal to) the preset threshold.

Uplink SRS sending is still used as an example. If the base station cannot clearly configure a transmit panel of each SRS, the "single panel mode" means that the UE uses one panel to transmit all the SRS resources. In addition, the "multi-panel mode" means that the UE uses a plurality of panels to send all the SRS resources.

In this application, in the multi-panel mode, the UE may sequentially use a plurality of panels, or the UE may simultaneously use a plurality of panels. For example, the UE sequentially uses the plurality of panels to perform beam training, or may simultaneously use the plurality of panels to perform beam training.

S106: The UE communicates with the base station when the UE is in the DRX ON mode.

The UE communicates with the base station by using a suitable beam based on a result of beam training in S105. Communication content includes but is not limited to listening to a PDCCH based on a configuration of the base station, measuring and reporting a CSI-RS, sending an SRS, sending an uplink PUCCH, transmitting a PDSCH/PUSCH, and the like.

Certainly, a beam may change in the communication process, and a new beam is used for communication.

S107: The UE re-enters the sleep mode.

Based on the DRX configuration, the UE re-enters the sleep mode and enters a next DRX cycle.

In the foregoing embodiment, the UE activates a panel based on sleep duration between two consecutive DRX ON modes, so that a suitable panel can be enabled in time, and a suitable beam can be further found for communication with the base station, thereby reducing power consumption of the UE.

Figure 5:
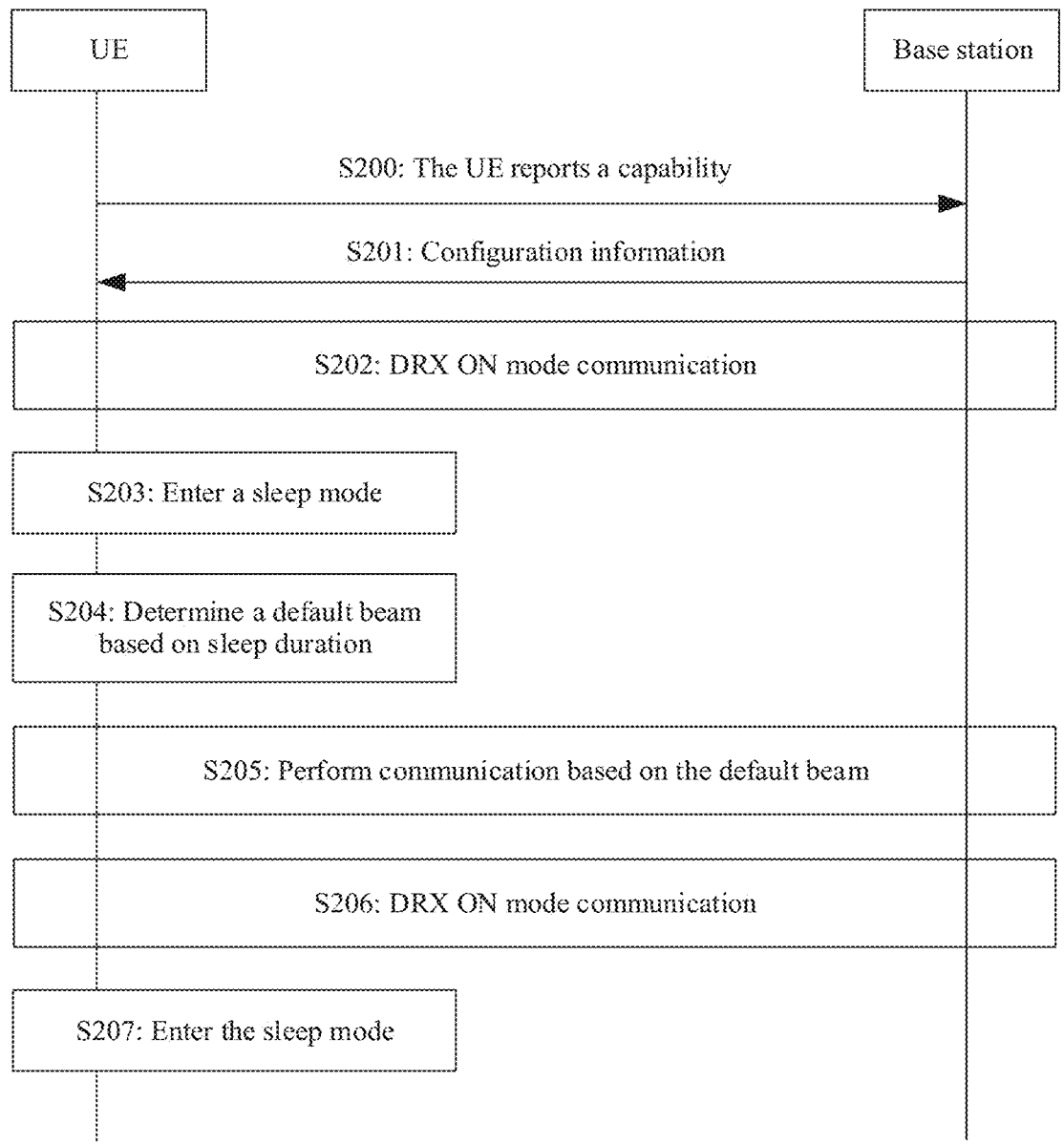
FIG. 5 is a flowchart of a beam management method according to an embodiment of this application.

In another embodiment, the UE may determine, based on sleep duration between two consecutive DRX ON modes, a beam used as a default beam for communication with the base station, to find a suitable beam in time. In this way, a panel corresponding to the default beam may be enabled alone, thereby reducing power consumption of the UE. Specifically, as shown in FIG. 5, a beam management method includes the following steps:

S200: UE reports a capability, where reference may be made to S100, details are not described again, and this step is optional.

S201: A base station sends configuration information to the UE.

The configuration information in this embodiment includes a DRX configuration, and reference may be made to the foregoing descriptions of DRX.

The configuration information may further include one or more of the following:
- a downlink control channel configuration, including an indication of a beam of a downlink control channel;
- an uplink control channel configuration, including an indication of a beam of an uplink control channel;
- a downlink data channel configuration, including an indication of a beam of a downlink data channel; and
- an uplink data channel configuration, including an indication of a beam of an uplink data channel.

The downlink control channel may be a PDCCH, the uplink control channel may be a PUCCH, the downlink data channel may be a PDSCH, and the uplink data channel may be a PUSCH. Each of the foregoing configurations indicates a beam for sending each channel.

For other content, refer to S101. Details are not described again.

S202: The UE communicates with the base station when the UE is in a DRX ON mode.

Similar to S102, communication content includes but is not limited to listening to a PDCCH based on the configuration, measuring and reporting a CSI-RS, sending an SRS, sending an uplink PUCCH, transmitting a PDSCH/PUSCH, and the like.

S203: The UE enters a sleep mode.

The UE enters the sleep mode based on the DRX configuration. For example, the UE no longer listens to the PDCCH.

S204: The UE re-enters the DRX ON mode, and selects a default beam for communication with the base station.

The UE determines, based on sleep duration, the default beam for communication with the base station.

For example, if the sleep duration is less than (or less than or equal to) a preset threshold, a beam used last time is used as the default beam for communication with the base station; or if the sleep duration is greater than or equal to (or greater than) a preset threshold, a beam determined during random access is used as the default beam for communication with the base station. For example, the UE listens to the control channel PDCCH by using the determined default beam.

If the sleep duration is less than or equal to the preset duration threshold, the UE uses the most recently used beam, such as a beam used to communicate with the base station when the UE is in the DRX ON mode last time or a beam configured or activated by the base station last time, as the default beam to communicate with the base station.

The most recently used beam may include one or more of the following, for example:
- a most recently used beam for receiving a PDCCH/PDSCH/CSI-RS;
- a most recently configured or activated beam for receiving a PDCCH/PDSCH/CSI-RS;
- a most recently used beam for sending a PUCCH/PUSCH/SRS/RACH; and
- a most recently configured or activated beam for sending a PUCCH/PUSCH/SRS/RACH.

The UE may use the most recently used beam as the default beam to receive the PDCCH/PDSCH/CSI-RS and the like, and send the PUCCH/PUSCH/SRS/RACH and the like.

If the sleep duration is greater than the preset duration threshold, the UE uses the beam determined during random access as the default beam to communicate with the base station, for example, listen to a PDCCH. The beam determined during random access includes one or more of the following: a beam determined during initial access, a beam determined in a link reconfiguration process, or a beam determined in a re-timing process or an uplink synchronization process.

Communication content also includes receiving a PDCCH/PDSCH/CSI-RS and the like, and sending a PUCCH/PUSCH/SRS/RACH and the like.

After the default beam is determined, the UE only needs to enable a panel corresponding to the default beam. Certainly, some or all configured panels may be enabled. This is not limited in this embodiment.

In addition, if there is any beam management action within the sleep duration, the UE may re-determine, based on a beam management result, a beam for communication with the base station.

Currently, a wake-up signal is discussed in a standard. If there is a wake-up signal, the UE can still perform beam measurement or beam selection during the sleep mode.

If a beam of a related channel has been configured in S201, for example, the beam of the downlink control channel has been configured, the foregoing default beam is used to replace the configured beam.

In the foregoing example, when the UE re-enters the DRX ON mode, the panel corresponding to the default beam is activated. Certainly, some of or all the configured panels may be activated, provided that the panel corresponding to the default beam is included.

Calculation of the sleep duration is similar to that in S204, and details are not described again.

In another example, the most recently used beam may alternatively be replaced with a preset beam. For example, the preset beam may be one or more of the following:
- a beam with a smallest and/or largest beam ID;
- a beam used to receive and/or send a low-frequency signal; and
- a beam with a highest and/or lowest transmit power.

S205: The UE communicates with the base station when the UE is in the DRX ON mode by using the determined default beam.

In addition to listening to a PDCCH, the communication with the base station by using the default beam may further include: receiving a PDCCH/PDSCH/CSI-RS and the like, and sending a PUCCH/PUSCH/SRS/RACH and the like, but is not limited to the following cases, for example:
- the base station sends data or a PDSCH, and the UE receives the data or the PDSCH;
- the UE sends an uplink control channel, for example, a PUCCH, and the base station receives the uplink control channel sent by the UE; and
- the UE sends an uplink data channel, for example, a PUSCH, and the base station receives the uplink data channel sent by the UE.

Similarly, if the beam of the foregoing related channel or a beam of a related signal has been configured in S201, in this embodiment, the determined default beam may be used to replace a previous configuration.

In a process of communication with the base station by using the default beam, if a terminal device receives, by using the default beam, signaling or information that is delivered by a network device and that is used to indicate a beam management resource, the terminal device may perform beam training. Specifically, beam training may be performed by using the panel corresponding to the default beam, or beam training may be performed by using some of or all the configured panels. For example, if the sleep duration is less than the preset threshold, the terminal device performs beam training by using a single panel, for example, performs beam training by using a panel used last time, that is, performs beam training by using a panel used for communication with the base station when the UE is in the DRX ON mode last time or a panel corresponding to the beam used last time. If the sleep duration is greater than or equal to the preset threshold, the terminal device performs beam training by using a plurality of panels or all configured panels. This process is similar to that of various cases in S105, and reference may be made to the foregoing embodiment. Details are not described again.

In addition, the sleep duration may not be considered, and all the configured panels may be directly used to perform beam training.

After the beam training, a beam for communication with the base station may be re-determined.

S206: The UE performs normal communication with the base station in the DRX ON mode.

In a communication process, if the base station reconfigures a beam for communication, the UE communicates with the base station by using the newly configured beam. For example, if the base station reconfigures a beam of a PDCCH, the UE stops using the default beam, and starts to use the beam reconfigured by the base station to listen to the PDCCH. For example, the beam of the PDCCH is configured based on a CORESET. If the base station reconfigures a beam of a CORESET #1, the CORESET #1 is received by using the beam newly configured by the base station, and another CORESET is still received by using the default beam until the base station performs reconfiguration.

Similar to the case of the PDCCH, the foregoing method is also applicable to transmission of a channel and a signal such as a PDSCH/PUCCH/PUSCH/CSI-RS/SRS.

Normal communication includes but is not limited to listening to a PDCCH based on a configuration, measuring and reporting a CSI-RS, sending an SRS, sending an uplink PUCCH, transmitting a PDSCH/PUSCH, and the like. Alternatively, the beam reconfigured by the base station may be used for communication.

Similarly, in a process of normal communication with the base station, if the terminal device receives signaling or a message that is used to indicate a beam management resource and that is delivered by the network device, beam training may be performed. Specifically, beam training may be performed by using the panel corresponding to the default beam, or beam training may be performed by using some of or all the configured panels. For example, if the sleep duration is less than the preset threshold, the terminal device performs beam training by using a single panel, for example, performs beam training by using a panel used last time, that is, performs beam training by using a panel used for communication with the base station when the UE is in the DRX ON mode last time or a panel corresponding to the beam used last time. If the sleep duration is greater than or equal to the preset threshold, the terminal device performs beam training by using a plurality of panels or all configured panels.

If the sleep duration is greater than or equal to the preset threshold, the terminal device may alternatively perform beam training by using the single panel, for example, perform beam training by using a panel corresponding to the beam determined during random access.

The foregoing process is similar to that in S105, and details are not described again.

The UE may select, based on a beam training result, a suitable beam to communicate with the base station; or may report a beam training result to the base station, and the base station determines a suitable beam and notifies the UE of the suitable beam.

S207: The UE re-enters the sleep mode.

After the communication ends, based on the DRX configuration, the UE re-enters the sleep mode and enters a next DRX cycle.

In the foregoing embodiments, the configuration information delivered by the base station to the UE may further include:

1. A beam management resource measurement cycle, related to a DRX cycle, which may be the same as the DRX cycle or may be an integer multiple of the DRX cycle, and includes one or more of the following:
    a dedicated beam management configuration, including an uplink beam management resource configuration or a downlink beam management resource configuration and the like, where for example, there is a beam management opportunity each time the UE enters the DRX ON mode, and the base station does not need to schedule a beam for training; and
    further, only when the sleep duration is greater than the threshold, the UE enters the DRX ON mode, and the UE performs beam training, where when the sleep duration is excessively short, beam training does not need to be performed:

2. A beam reporting cycle, related to a DRX cycle, which may be the same as the DRX cycle or may be an integer multiple of the DRX cycle, and includes one or more of the following:
    a dedicated reporting configuration, including a reported time-frequency resource and the like, where there is a reporting resource used for beam reporting each time the UE enters the DRX ON mode, and the base station does not need to schedule a beam for reporting; and
    further, only when the sleep duration is greater than the threshold, the UE enters the DRX ON mode, and the UE performs reporting, where when the sleep duration is excessively short, beam reporting does not need to be performed; and 3. A DRX cycle configuration of each panel, where for example, information used to identify a panel, such as a panel ID, is added to all DRX-related parameters.

In this application, the panel ID is information used to identify a panel, and includes a physical panel ID and/or a logical panel ID. If one panel has an association relationship with one or more reference signals or reference signal sets, the panel ID may also be an identifier of the reference signal or reference signal set.

In the foregoing embodiments, "greater than" may also be greater than or equal to, and "less than" may also be less than or equal to, and vice versa. "/" usually represents an "and/or" relationship, and a plurality of consecutive "7" may be used to represent that one or more of items are selected.

In this application, various information delivered by the network device to the terminal device, such as the configuration information and the threshold, may be configured by the network device and delivered to the terminal device. The configuration information may be carried in any one or more of a physical broadcast channel (PBCH), remaining minimum system information (RMSI), a system information block (SIB) 1, a SIB 2, or a SIB 3, a media access control element (MAC-CE), downlink control information (DCI), radio resource control (RRC), and system information. The various information may also be specified in a standard, or may be pre-agreed on by the network device and the terminal device.

In this application, various information reported by the terminal device to the network device may be transmitted through uplink physical layer information such as uplink control information (UCI), or may be transmitted through uplink higher layer information such as an uplink MAC-CE or uplink RRC.

Because a beam usually corresponds to an SSB or a CSI-RS, the beam in this application may also be represented by an SSB or a CSI-RS, or may be referred to as a beam corresponding to an SSB or a CSI-RS.

It should be further understood that sequence numbers of the foregoing processes do not mean execution sequences. The execution sequences of the processes should be determined based on functions and internal logic of the processes, but should not be construed as any limitation on the implementation processes of the embodiments of this application.

It should be further understood that in the embodiments of this application, "presetting" and "predefinition" may be implemented by pre-storing, in a device (including, for example, the terminal device and the network device), corresponding code, a corresponding table, or another manner that can be used to indicate related information. A specific implementation is not limited in this application.

Based on the method in the foregoing embodiments, the following describes a communications apparatus provided in this application.

Figure 6:
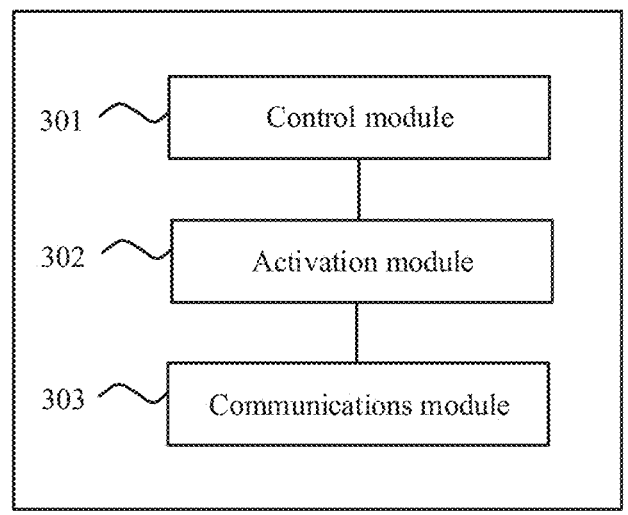
FIG. 6 is a schematic block diagram of a communications apparatus according to an embodiment of this application.

Corresponding to the foregoing panel management method, a communications apparatus is further disclosed. The apparatus may be the terminal device in the method, or may be a chip, a functional module, a functional unit, or the like in the terminal device. FIG. 6 is a schematic structural diagram of the communications apparatus provided in this application. The communications apparatus includes:

- a control module 301, configured to control mode switching of the communications apparatus, for example, control the communications apparatus to enter a sleep mode from an active mode or enter an active mode from a sleep mode, and
- an activation module 302, configured to activate or enable a panel of the communications apparatus, where for example, when the communications apparatus is ready to re-enter the active mode from the sleep mode, the activation module is configured to activate a single panel of the terminal device if sleep duration is less than a preset threshold; or the activation module is configured to activate a plurality of panels of the terminal device if sleep duration is greater than or equal to a preset threshold.

The communications apparatus may further include a communications module 303, configured to: if the sleep duration is less than the preset threshold, use the activated single panel for beam training; or if the sleep duration is greater than or equal to the preset threshold, use the plurality of activated panels for beam training.

The foregoing modules separately implement steps in the panel management method embodiment. In addition, another module may be further included, for example, a sending module, configured to implement a sending step in the method embodiment; a receiving module, configured to implement a receiving step in the method embodiment; and a processing module, configured to implement a processing step other than the sending and receiving steps. For details, refer to corresponding steps in the method embodiment. The sending module and the receiving module may form a transceiver module, and a function of the transceiver module may be implemented by the communications module 303.

In addition, the modules may be named and obtained through division in other manners that are not limited to foregoing manner. For example, the functions of the control module and the activation module may be implemented by the processing module, or the function of the activation module is implemented by the communications module or the processing module. Alternatively, the modules may be obtained through division in other manners that are not limited to the foregoing division manner. The modules may also be referred to as units.

The control module may also be referred to as a mode switching module, and the activation module may also be referred to as a panel switch module. Certainly, another naming method may alternatively be used.

The communications apparatus may further include a storage module, configured to store instructions executed in the foregoing modules.

The communications apparatus may be a terminal device, or may be a chip in a terminal device. When the communications apparatus is a terminal device, the control module and the activation module may be a processor, and the communications module may be a transceiver. The communications apparatus may further include a storage unit, and the storage unit may be a memory. The storage unit is configured to store instructions, and the processing module executes the instructions stored in the storage unit, to enable the communications apparatus to perform the foregoing method. When the communications apparatus is the chip in the terminal device, the control module and the activation module may be a processor, the communications module may be an input/output interface, a pin, a circuit, or the like. The processing module executes instructions stored in a storage module, so that the communications apparatus performs an operation performed by the terminal device in the foregoing method embodiment. The storage module may be a storage unit (for example, a register or a buffer) in the chip, or may be a storage unit (for example, a read-only memory or a random access memory) that is outside the chip and that is in the terminal device.

Figure 7:
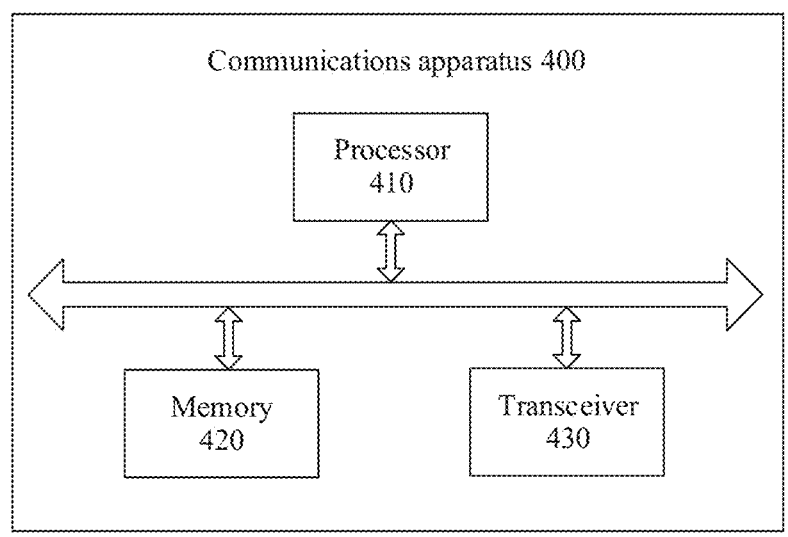
FIG. 7 is a schematic block diagram of another communications apparatus according to an embodiment of this application.

In an embodiment in another form, as shown in FIG. 7, a communications apparatus 400 may include a processor 410, a memory 420, and a transceiver 430. The transceiver 430 implements the function of the communications module 303, and other modules such as the control module 301 and the activation module 302 may be implemented by the processor 410. The memory 420 stores a necessary program and necessary data.

It may be clearly understood by a person skilled in the art that, for steps performed by the communications apparatus and corresponding beneficial effects, refer to related descriptions of the terminal device in the foregoing method embodiment. For brevity, details are not described herein again.

The communications apparatus shown in FIG. 6 or FIG. 7 can implement the foregoing panel management method embodiment and the steps performed by the terminal device in FIG. 3. For similar descriptions, refer to the descriptions in the foregoing corresponding method. To avoid repetition, details are not described herein again.

Figure 8:
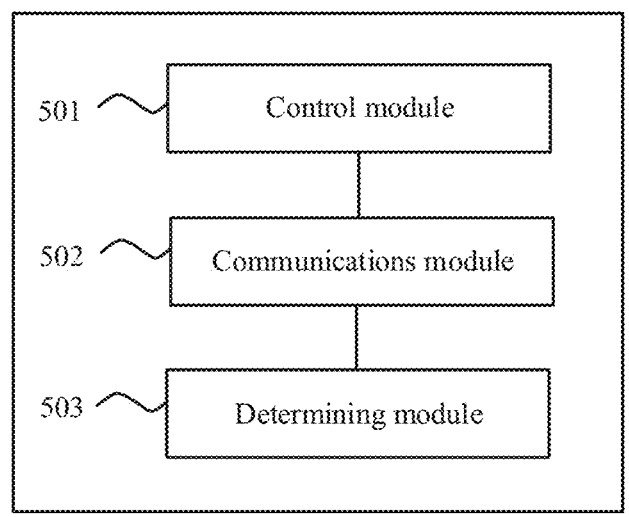
FIG. 8 is a schematic block diagram of still another communications apparatus according to an embodiment of this application.

Corresponding to the foregoing beam management method, a communications apparatus is further disclosed. The apparatus may be a terminal device, or may be a chip, a functional module, a functional unit, or the like in a terminal device. FIG. 8 is a schematic structural diagram of the communications apparatus provided in this application. The communications apparatus includes:

a control module 501, configured to control mode switching of the communications apparatus, for example, control the communications apparatus to enter a sleep mode from an active mode or enter an active mode from a sleep mode; and a communications module 502, configured to select a suitable beam to communicate with a network device, where for example, when the communications apparatus re-enters the active mode from the sleep mode, if sleep duration is less than a preset threshold, the communications module is configured to communicate with the network device by using a beam used last time; or if sleep duration is greater than or equal to a preset threshold, the communications module is configured to communicate with the network device by using a beam determined during random access.

The communications apparatus further includes a determining module 503, configured to: if the communications apparatus performs beam training in the sleep mode, when the communications apparatus re-enters the active mode, determine, based on a beam training result, a beam for communication with the network device.

The communications module 502 is further configured to: if the sleep duration is less than the preset threshold, receive, by using the beam used last time, signaling that is used to indicate a beam management resource and that is delivered by the network device, and perform beam training based on the beam management resource by using a single panel: or if the sleep duration is greater than or equal to the preset threshold, receive, by using the beam determined during random access, signaling that is used to indicate a beam management resource and that is delivered by the network device, and perform beam training based on the beam management resource by using a plurality of panels.

The foregoing modules separately implement steps in a corresponding method embodiment. In addition, another module may be further included, for example, a sending module, configured to implement a sending step in the method embodiment; a receiving module, configured to implement a receiving step in the method embodiment; and a processing module, configured to implement a processing step other than the sending and receiving steps. For details, refer to corresponding steps in the method embodiment. The sending module and the receiving module may form a transceiver module, and a function of the transceiver module may be implemented by the communications module 502.

In addition, the modules may be named and obtained through division in other manners that are not limited to the foregoing manner. For example, the functions of the control module and the determining module may be implemented by the processing module, or the function of the control module is implemented by the determining module. Alternatively, the modules may be obtained through division in other manners that are not limited to the foregoing division manner. The modules may also be referred to as units.

The control module may also be referred to as a mode switching module. Certainly, another naming method may alternatively be used.

The communications apparatus may further include a storage module, configured to store instructions executed in the foregoing modules.

The communications apparatus may be a terminal device, or may be a chip in a terminal device. When the communications apparatus is a terminal device, the control module and the determining module may be a processor, and the communications module may be a transceiver. The communications apparatus may further include a storage module, and the storage unit may be a memory. The storage unit is configured to store instructions, and the processing module executes the instructions stored in the storage unit, to enable the communications apparatus to perform the foregoing method. When the communications apparatus is the chip in the terminal device, the control module and the determining module may be a processor, the communications module may be an input/output interface, a pin, a circuit, or the like. The processing module executes instructions stored in a storage module, so that the communications apparatus performs an operation performed by the terminal device in the foregoing method embodiment. The storage module may be a storage unit (for example, a register or a buffer) in the chip, or may be a storage unit (for example, a read-only memory or a random access memory) that is outside the chip and that is in the terminal device.

Figure 9:
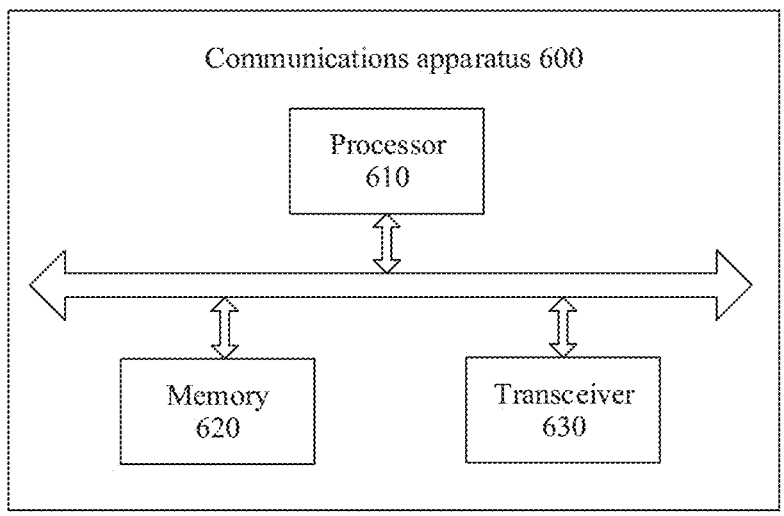
FIG. 9 is a schematic block diagram of yet another communications apparatus according to an embodiment of this application.

In an embodiment in another form, as shown in FIG. 9, a communications apparatus 600 may include a processor 610, a memory 620, and a transceiver 630. The transceiver 630 implements the function of the communications module 502, and other modules such as the control module 501 and the determining module 503 may be implemented by the processor 610. The memory 620 stores a necessary program and necessary data.

It may be clearly understood by a person skilled in the art that, for steps performed by the communications apparatus and corresponding beneficial effects, refer to related descriptions of the terminal device in the foregoing method embodiment. For brevity, details are not described herein again.

The communications apparatus shown in FIG. 8 or FIG. 9 can implement the foregoing beam management method embodiment and the steps performed by the terminal device in FIG. 5. For similar descriptions, refer to the descriptions in the foregoing corresponding method. To avoid repetition, details are not described herein again.

Deployment and connection manners of the modules or units in the accompanying drawings of the foregoing apparatus embodiments are merely examples of associations between the corresponding method steps, and are not limited to the foregoing manners. Other connection manners may be used between the modules or units. For example, any two modules are connected, a sequence of modules may also be changed, and then the modules are connected in series.

The terminal device in each of the foregoing apparatus embodiments corresponds to the terminal device in the method embodiments, and a corresponding module or unit performs a corresponding step. For example, a communications unit (or a transceiver unit or a transceiver) performs a sending step and/or a receiving step in the method embodiments (or a sending unit and a receiving unit perform the steps respectively), and another step other than the sending step and the receiving step may be performed by a processing unit. For a function of a specific unit, refer to a corresponding method embodiment. The sending unit and the receiving unit may form a transceiver unit, and a transmitter and a receiver may form a transceiver, to jointly implement receiving and sending functions in the method embodiments. There may be one or more processors.

One or more of the foregoing modules or units may be implemented by software, hardware, or a combination thereof. When any one of the foregoing modules or units is implemented by software, the software exists in a form of computer program instructions that are stored in a memory. The processor may be configured to execute the program instructions to implement the foregoing method procedures. The processor may include but is not limited to at least one of the following computing devices that run various types of software: a central processing unit (CPU), a microprocessor, a digital signal processor (DSP), a microcontroller unit (MCU), an artificial intelligence processor, or the like. Each computing device may include one or more cores used to perform an operation or processing by executing the software instructions. The processor may be embedded in a system on a chip (SoC) or an application-specific integrated circuit (ASIC), or may be an independent semiconductor chip. In addition to the core used to perform an operation or processing by executing the software instructions, the processor may further include a necessary hardware accelerator, for example, a field programmable gate array (FPGA), a programmable logic device (PLD), or a logic circuit that implements a dedicated logic operation.

When the foregoing modules or units are implemented by hardware, the hardware may be any one or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete device, and the hardware may run necessary software or does not depend on software, to perform the foregoing method procedures.

It should be understood that division into the foregoing units is merely function division, and may be other division in actual implementation.

The terminal device may be a chip, and the processing unit may be implemented by hardware or may be implemented by software. When the processing unit is implemented by hardware, the processing unit may be a logic circuit, an integrated circuit, or the like. When the processing unit is implemented by software, the processing unit may be a general-purpose processor, and is implemented by reading software code stored in a storage unit. The storage unit may be integrated into the processor, or may be located outside the processor and exist independently.

Figure 10:
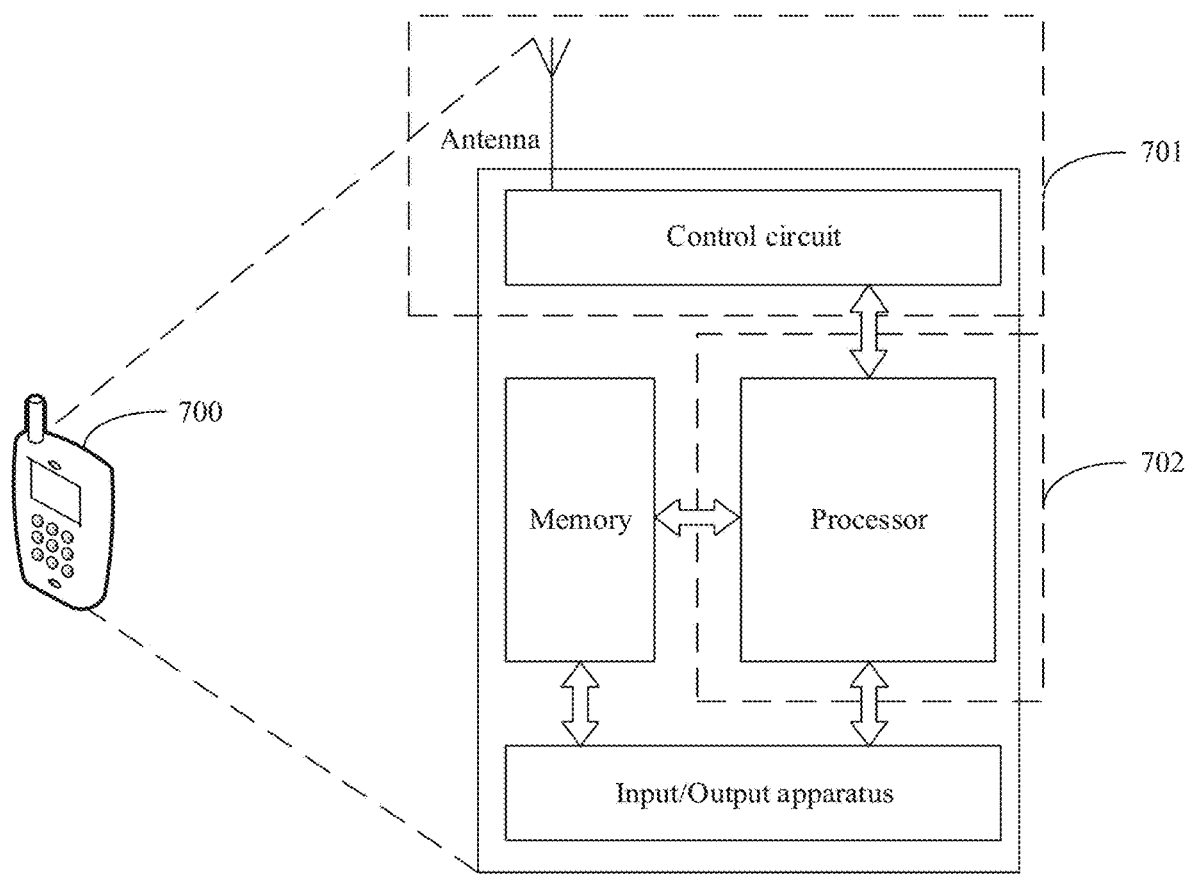
FIG. 10 is a schematic structural diagram of a terminal device according to an embodiment of this application.

FIG. 10 is a schematic structural diagram of a terminal device 700 according to this application. For ease of description, FIG. 10 shows only main components of the terminal device. As shown in FIG. 10, the terminal device 700 includes a processor, a memory, a control circuit, an antenna, and an input/output apparatus. The terminal device 700 can be used in the system shown in FIG. 1, and performs the functions of the terminal device in the foregoing method embodiments.

The processor is mainly configured to process communications data, control the entire terminal device, execute a software program, and process data of the software program, for example, configured to control the terminal device in performing the actions described in the foregoing method embodiments. The memory is mainly configured to store the software program and the data. The control circuit is mainly configured to perform conversion between a baseband signal and a radio frequency signal and process the radio frequency signal. The control circuit, together with the antenna, may also be referred to as a transceiver that is mainly configured to send and receive a radio frequency signal in an electromagnetic wave form. The input/output apparatus, such as a touchscreen, a display, or a keyboard, is mainly configured to: receive data input by a user, and output data to the user.

After the terminal device is powered on, the processor may read the software program in the memory, explain and execute instructions of the software program, and process the data of the software program. When data needs to be sent in a wireless manner, the processor performs baseband processing on the to-be-sent data, and then outputs a baseband signal to a radio frequency circuit. The radio frequency circuit performs radio frequency processing on the baseband signal, and then sends, by using the antenna, the radio frequency signal in the electromagnetic wave form. When data is sent to the terminal device, the radio frequency circuit receives the radio frequency signal by using the antenna, converts the radio frequency signal into a baseband signal, and outputs the baseband signal to the processor. The processor converts the baseband signal into data and processes the data.

A person skilled in the art may understand that for ease of description, FIG. 10 shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communications protocol and the communications data. The central processing unit is mainly configured to control the entire terminal device, execute the software program, and process the data of the software program. The processor in FIG. 10 integrates functions of the baseband processor and the central processing unit. A person skilled in the art may understand that the baseband processor and the central processing unit may be respectively independent processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be referred to as a baseband processing circuit or a baseband processing chip. The central processing unit may also be referred to as a central processing circuit or a central processing chip. A function of processing the communication protocol and the communications data may be embedded into the processor, or may be stored in the memory in a form of a software program, so that the processor executes the software program to implement a baseband processing function.

For example, in the embodiment shown in FIG. 10, the antenna and the control circuit that have receiving and sending functions may be considered as a transceiver unit 701 of the terminal device 700, and the processor having a processing function may be considered as a processing unit 702 of the terminal device 700. As shown in FIG. 10, the terminal device 700 includes the transceiver unit 701 and the processing unit 702. The transceiver unit may also be referred to as a transceiver, a transceiver machine, a transceiver apparatus, or the like. Optionally, a component that is in the transceiver unit 701 and that is configured to implement a receiving function may be considered as a receiving unit, and a component that is in the transceiver unit 701 and that is configured to implement a sending function may be considered as a sending unit. In other words, the transceiver unit 701 includes the receiving unit and the sending unit. For example, the receiving unit may also be referred to as a receiver, a receiver machine, a receiving circuit, or the like, and the sending unit may be referred to as a transmitter, a transmitter machine, a transmitting circuit, or the like.

The terminal device 700 shown in FIG. 10 can implement all processes related to the terminal device in the method embodiment in FIG. 2. The operations and/or the functions of the modules in the terminal device 700 are intended to implement corresponding procedures in the foregoing method embodiments. For details, refer to the descriptions in the foregoing method embodiments. To avoid repetition, detailed descriptions are properly omitted herein.

It should be understood that, the foregoing processor may be a chip. For example, the processor may be a field programmable gate array (FPGA), an application specific integrated circuit (ASIC), a system on a chip (SoC), a central processing unit (CPU), a network processor (NP), a digital signal processor (DSP), a micro controller unit (MCU), a programmable logic device (PLD), or another integrated chip.

In an implementation process, the steps of the methods in the embodiments may be performed by using a hardware integrated logical circuit in the processor, or by using instructions in a form of software. The steps of the methods disclosed with reference to the embodiments of this application may be directly performed by a hardware processor, or may be performed by a combination of hardware and software modules in the processor.

It should be noted that, the processor in the embodiments of this application may be an integrated circuit chip, and has a signal processing capability. In an implementation process, the steps in the foregoing method embodiments may be performed by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor in the embodiments of this application may implement or perform the methods, the steps, and the logical block diagrams that are disclosed in the embodiments of this application. The general-purpose processor may be a microprocessor, or the processor may be any conventional processor or the like.

It may be understood that the memory or storage unit in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through examples rather than limitative descriptions, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described in this specification include but are not limited to these memories and any memory of another suitable type.

An embodiment of this application further provides a computer-readable medium. The computer-readable medium stores a computer program, and when the computer program is executed by a computer, the method in any one of the foregoing embodiments is implemented.

An embodiment of this application further provides a computer program product. When the computer program product is executed by a computer, the method in any one of the foregoing embodiments is implemented.

An embodiment of this application further provides a system chip. The system chip includes a processing unit and a communications unit. The processing unit may be, for example, a processor. The communications unit may be, for example, an input/output interface, a pin, a circuit, or the like. The processing unit may execute computer instructions, so that a chip in a communications apparatus performs any method provided in the foregoing embodiments of this application.

Optionally, the computer instructions are stored in a storage unit.

All or some of the foregoing embodiments may be implemented by software, hardware, firmware, or any combination thereof. When software is used to implement the embodiments, some or all of the embodiments may be implemented in a form of a computer program product. The computer program product includes one or more computer instructions. When the computer instructions are loaded or executed on a computer, some or all of the procedures or functions according to the embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one item (one) of the following" or a similar expression thereof refers to any combination of the items, including a single item or any combination of a plurality of items. For example. "at least one of a, b, or c" may represent a; b; c; a and b; a and c; b and c; or a, b, and c, where a, b, and c may be singular or plural.

It should be understood that "one embodiment" or "an embodiment" mentioned in the entire specification means that particular features, structures, or characteristics related to this embodiment are included in at least one embodiment of this application. Therefore, "in one embodiment" or "in an embodiment" throughout the entire specification does not necessarily refer to a same embodiment. In addition, these particular features, structures, or characteristics may be combined in one or more embodiments in any proper manner. It should be understood that sequence numbers of the foregoing processes do not mean execution sequences in the embodiments of this application. The execution sequences of the processes should be determined based on functions and internal logic of the processes, but should not be construed as any limitation on the implementation processes of the embodiments of this application.

What is claimed is:

1. An antenna panel management method, wherein the method comprises:
    entering, by a terminal device, a sleep mode from an active mode; and
    when the terminal device is ready to re-enter the active mode from the sleep mode,
        in response to determining that a sleep duration is less than a preset threshold, activating a single panel of the terminal device that is a panel used last time or communicating with a network device by using a beam used last time; and
        in response to determining that the sleep duration is greater than or equal to the preset threshold, activating a plurality of panels of the terminal device or communicating with a network device by using a beam determined during random access.

2. The method according to claim 1, wherein:
    in response to determining that the sleep duration is less than the preset threshold, the method further comprises: performing, by the terminal device, beam management by using the single panel that was activated; and
    in response to determining that the sleep duration is greater than or equal to the preset threshold, the method further comprises: performing, by the terminal device, the beam management by using a plurality of activated panels.

3. The method according to claim 2, wherein the plurality of activated panels of the terminal device are all configured panels.

4. The method according to claim 1, wherein the panel used last time comprises one or more of the following:
    a most recently used panel for receiving a physical downlink control channel (PDCCH), a physical downlink shared channel (PDSCH), or a channel state information reference signal (CSI-RS);
    a most recently configured or activated panel for receiving a PDCCH, a PDSCH, or a CSI-RS;
    a most recently used panel for sending a physical uplink control channel (PUCCH), a physical uplink shared channel (PUSCH), a sounding reference signal (SRS), or a random access channel (RACH); or
    a most recently configured or activated panel for sending a PUCCH, a PUSCH, an SRS, or a RACH.

5. The method according to claim 1, wherein the method further comprises:
    if the terminal device performs beam management in the sleep mode and when the terminal device re-enters the active mode, determining, based on a beam management result, a beam for communication with the network device.

6. The method according to claim 1, wherein:
    in response to determining that the sleep duration is less than the preset threshold, the method further comprises:
        receiving, by the terminal device and using the beam used last time, signaling that is used to indicate a beam management resource and that is delivered by the network device, and
        performing beam management based on the beam management resource by using a single panel; and
    in response to determining that the sleep duration is greater than or equal to the preset threshold, the method further comprises:
        receiving, by the terminal device and using a beam determined during random access, the signaling that is used to indicate the beam management resource and that is delivered by the network device, and
        performing the beam management based on the beam management resource by using a plurality of panels.

7. The method according to claim 6, wherein the beam determined during random access comprises one or more of the following: a beam determined during initial access, a beam determined in a link reconfiguration process, or a beam determined in a re-timing process or an uplink synchronization process.

8. The method according to claim 1, wherein the beam used last time comprises one or more of the following:
    a most recently used panel for receiving a physical downlink control channel (PDCCH), a physical downlink shared channel (PDSCH), or a channel state information reference signal (CSI-RS);
    a most recently configured or activated panel for receiving a PDCCH, a PDSCH, or a CSI-RS;
    a most recently used panel for sending a physical uplink control channel (PUCCH), a physical uplink shared channel (PUSCH), a sounding reference signal (SRS), or a random access channel (RACH); or
    a most recently configured or activated panel for sending a PUCCH, a PUSCH, an SRS, or a RACH.

9. A communications apparatus, comprising:
    at least one processor; and
    one or more memories coupled to the at least one processor and storing instructions for execution by the at least one processor to:
        control the communications apparatus to enter a sleep mode from an active mode; and
        when the communications apparatus is ready to re-enter the active mode from the sleep mode,
            in response to determining that a sleep duration is less than a preset threshold, activate a single panel of the communications apparatus that is a panel used last time or communicate with a network device by using a beam used last time; and
            in response to determining that the sleep duration is greater than or equal to the preset threshold, activate a plurality of panels of the communications apparatus or communicate with a network device by using a beam determined during random access.

10. The communications apparatus according to claim 9, wherein one or more memories store the instructions for execution by the at least one processor further to:
    in response to determining that the sleep duration is less than the preset threshold, perform beam management by using the single panel that was activated; or
    in response to determining that the sleep duration is greater than or equal to the preset threshold, perform the beam management by using a plurality of activated panels.

11. The communications apparatus according to claim 9, wherein the one or more memories store the instructions for execution by the at least one processor further to:
    if the communications apparatus performs beam management in the sleep mode and when the communications apparatus re-enters the active mode, determine, based on a beam management result, a beam for communication with the network device.

12. The communications apparatus according to claim 9, wherein the one or more memories store the instructions for execution by the at least one processor further to:
- in response to determining that the sleep duration is less than the preset threshold,
  - receive, by using the beam used last time, signaling that is used to indicate a beam management resource and that is delivered by the network device; and
  - perform beam management based on the beam management resource by using a single panel; and
- in response to determining that the sleep duration is greater than or equal to the preset threshold,
  - receive, by using the beam determined during random access, the signaling that is used to indicate the beam management resource and that is delivered by the network device; and
  - perform the beam management based on the beam management resource by using a plurality of panels.

\* \* \* \* \*